US011622492B2

(12) United States Patent
Christie et al.

(10) Patent No.: US 11,622,492 B2
(45) Date of Patent: Apr. 11, 2023

(54) VARIABLE TOOTH COULTER BLADE WITH SIZED INSERTS

(71) Applicant: PRESCRIPTION TILLAGE TECHNOLOGY, LLC, Red Oak, IA (US)

(72) Inventors: Richard L. Christie, Clarinda, IA (US); Daniel D. Schuler, Atlantic, IA (US); James L. Wheat, Red Oak, IA (US)

(73) Assignee: PRESCRIPTION TILLAGE TECHNOLOGY, LLC, Red Oak, IA (US)

( * ) Notice: Subject to any disclaimer, the term of this patent is extended or adjusted under 35 U.S.C. 154(b) by 1133 days.

(21) Appl. No.: 16/227,061

(22) Filed: Dec. 20, 2018

(65) Prior Publication Data

US 2019/0116714 A1    Apr. 25, 2019

Related U.S. Application Data

(63) Continuation of application No. 14/961,849, filed on Dec. 7, 2015, now Pat. No. 10,159,171, which is a continuation of application No. 14/590,855, filed on Jan. 6, 2015, now Pat. No. 9,204,588, which is a continuation of application No. 14/162,259, filed on Jan. 23, 2014, now abandoned.

(60) Provisional application No. 61/756,841, filed on Jan. 25, 2013.

(51) Int. Cl.
*A01B 15/18* (2006.01)
*A01B 23/06* (2006.01)

(52) U.S. Cl.
CPC .............. *A01B 15/18* (2013.01); *A01B 23/06* (2013.01)

(58) Field of Classification Search
CPC ......... A01B 15/16; A01B 15/18; A01B 33/10; A01B 33/103; A01B 33/106; A01B 23/06; B28D 1/121; B28D 1/122; B23D 61/025
See application file for complete search history.

(56) References Cited

U.S. PATENT DOCUMENTS

| 615,005 | A | | 11/1898 | Walquist |
| 814,716 | A | | 3/1906 | MacDonell |
| 994,707 | A | | 6/1911 | Meissner |
| 1,186,880 | A | | 6/1916 | Canda |
| 1,873,128 | A | * | 8/1932 | Johnson ................. A01C 5/062 111/163 |
| 2,084,055 | A | | 6/1937 | Cascadden |
| 2,357,528 | A | | 9/1944 | Lutes |

(Continued)

*Primary Examiner* — Jessica H Lutz
(74) *Attorney, Agent, or Firm* — Ernest D. Buff & Associates, LLC; Ernest D. Buff

(57) ABSTRACT

A system and method are disclosed for cutting and increasing surface area of surface stubble material while contemporaneously cutting and aerating the soil. A discoidal coulter blade is configured with a plurality of circumferential teeth for cutting the surface stubble as well as reducing the downward pressure required for the blade to enter the type and depth of soil desired. The circular coulter blade is configured with a plurality of inserts oriented normal to the rotational movement of the blade as the blade cuts the soil. Each insert is shaped to aerate a specific type of soil anticipated by an operator. The inserts are positioned on the blade for desired impact with the soil and angled in placement on the blade to maintain the desired effect on the soil.

21 Claims, 27 Drawing Sheets

(56) References Cited

U.S. PATENT DOCUMENTS

| | | | |
|---|---|---|---|
| 2,596,574 A | | 5/1952 | Lutes |
| 3,363,617 A | | 1/1968 | Hoerer |
| 3,521,684 A | | 7/1970 | Mcrobert |
| 4,016,934 A | | 4/1977 | Schneider |
| 4,033,270 A | | 7/1977 | Bezzerides |
| 4,047,576 A | * | 9/1977 | Rau ............... A01B 29/041 |
| | | | 172/120 |
| 4,930,487 A | | 6/1990 | Young |
| 5,197,453 A | | 3/1993 | Messina |
| 5,285,768 A | | 2/1994 | Messina |
| 5,285,854 A | | 2/1994 | Thacker |
| 5,299,647 A | * | 4/1994 | Mudd ............. A01B 33/103 |
| | | | 172/555 |
| 7,055,515 B2 | | 6/2006 | Bishop |
| 7,240,627 B1 | | 7/2007 | Whalen |
| 7,575,066 B2 | | 8/2009 | Bauer |
| 7,832,345 B2 | * | 11/2010 | Whalen ............. A01C 7/006 |
| | | | 172/603 |
| 8,186,450 B2 | | 5/2012 | Bauer |
| 8,550,019 B1 | * | 10/2013 | Reed ............... A01C 23/025 |
| | | | 111/166 |
| 8,627,898 B2 | | 1/2014 | Nance |
| 8,826,836 B2 | * | 9/2014 | Van Buskirk ....... A01C 7/006 |
| | | | 111/163 |
| 9,204,588 B1 | | 12/2015 | Christie |
| D796,559 S | * | 9/2017 | Bruce ............... A01C 5/064 |
| | | | D15/17 |
| 9,839,172 B2 | * | 12/2017 | Meier ............. A01B 33/103 |
| 2008/0245440 A1 | | 10/2008 | Paumier |
| 2011/0011603 A1 | * | 1/2011 | Bruce ............... A01B 23/06 |
| | | | 172/604 |
| 2014/0345893 A1 | | 11/2014 | Christie |

* cited by examiner

2100

2102 — embedding a discoidal coulter blade within the soil, the discoidal coulter blade configured with a blade hub and a blade circumference, the discoidal coulter blade having a plane parallel to each diameter line of the discoidal coulter blade, the blade hub configured for detachably mounting the discoidal coulter blade to an implement 2104 — translating the discoidal coulter blade through the soil at a depth via the implement 2106 — cutting the surface stubble and soil via a plurality of teeth configured proximal to and integral with the blade circumference, each one of the plurality of teeth having a cutting edge and a back edge, the back edge longitudinally opposite the cutting edge, the cutting edge and the back edge linear with the plane, the cutting edge configured to cut the surface stubble and the soil, the back edge configured for driving the discoidal coulter blade rotationally parallel to the plane as the soil acts on the back edge 2108 — aerating the soil via a plurality of inserts sized to securably mount within a plurality of evenly spaced insert openings, the insert openings configured in a circular pattern at a first radius from the blade hub, the first radius being less than the blade circumference, each of the plurality of evenly spaced insert openings having an insert angle, the plurality of evenly spaced insert openings at the insert angle, each one of the plurality of inserts configured to securably mount within one of the plurality of evenly spaced insert openings, each one of the plurality of inserts sized to fill an associated one of the plurality of evenly spaced insert openings, each one of the plurality of inserts is configured to extend, from the discoidal coulter blade, a lateral distance normal to the plane, the plurality of inserts configured to alter the soil as a portion of the insert, which extends the lateral distance, rotationally and translationally interacts with the soil

FIG. 21

VARIABLE TOOTH COULTER BLADE WITH SIZED INSERTS

CROSS-REFERENCE TO RELATED APPLICATIONS

The present application is a continuation of applicant's U.S. patent application Ser. No. 14/961,849, filed Dec. 7, 2015 which, in turn, is a continuation of U.S. patent application Ser. No. 14/590,855, filed Jan. 6, 2015, now U.S. Pat. No. 9,204,588, which in turn, is a continuation of U.S. patent application Ser. No. 14/162,259, filed Jan. 23, 2014 which, in turn, claims the benefit under 35 U.S.C. § 119(e) of U.S. Provisional Application Ser. No. 61/756,841, filed Jan. 25, 2013, the disclosures of which are hereby incorporated in their entirety by reference thereto.

FIELD OF THE INVENTION

The present invention relates generally to agriculture tillage equipment. More particularly, embodiments of the present invention relate to an efficient device for cutting surface stubble while simultaneously aerating the soil.

BACKGROUND THE INVENTION

Traditional agriculture requires turning of the soil to effectively bury desirable stubble to create needed composted material. With the advent of reduced tillage and minimum tillage farming techniques, coulter blades may be used to increase surface area by cutting and reducing the stubble to a manageable enabling compost and reuse of the desirable stubble.

Soil compression is an undesirable effect of tillage equipment interaction with the soil. Vehicle wheels and traditional coulter blades may compress the soil with which they may interact. Soil compression may multiply over time leading to less root enhancement, less root travel, and a lesser amount of air in the soil. These continued effects may result in an eventual reduction of product available to an operator.

A Genetically Modified Organism (GMO) stubble may be more substantial than traditional cellulose or stubble. Such GMO stubble is difficult for existing tillage devices to cut. A desired outcome of tillage equipment is GMO stubble cut into smaller segments for ease of compost and eventual GMO breakdown.

Traditional coulter blades may be unable to effectively cut GMO stubble and create a "wave" of stubble in front of the blade causing an eventual plug. This plug requires the operator to stop work and physically remove the plug before continuing operation.

Therefore, a need exists for a blade designed to effectively cut the more substantial GMO stubble while aerating the soil with a minimum amount of contact with the least amount of time.

SUMMARY

Accordingly, an embodiment of the present invention is directed to a coulter blade for altering soil and surface stubble, comprising: a discoidal coulter blade configured with a blade hub and a blade circumference, the discoidal coulter blade having a plane parallel to each diameter line of the discoidal coulter blade, the blade hub configured for detachably mounting the discoidal coulter blade to an implement; a plurality of teeth configured proximal to and integral with the blade circumference, each one of the plurality of teeth having a cutting edge and a back edge, the back edge longitudinally opposite the cutting edge, the cutting edge and the back edge linear with the plane, the cutting edge configured to cut the surface stubble and the soil, the back edge configured for driving the discoidal coulter blade rotationally parallel to the plane as the soil acts on the back edge; a plurality of evenly spaced insert openings configured in a circular pattern at a first radius from the blade hub, the first radius being less than the blade circumference, each of the plurality of evenly spaced insert openings having an insert angle; a plurality of inserts sized to securably mount within the plurality of evenly spaced insert openings at the insert angle, each one of the plurality of inserts configured to securably mount within one of the plurality of evenly spaced insert openings, each one of the plurality of inserts sized to fill an associated one of the plurality of evenly spaced insert openings, each one of the plurality of inserts is configured to extend, from the discoidal coulter blade, a lateral distance normal to the plane, the plurality of inserts configured to alter the soil as a portion of the insert, which extends the lateral distance, rotationally and translationally interacts with the soil.

An additional embodiment of the present invention is directed to a coulter blade wherein the cutting edge of a first half of the plurality of teeth is sharpened on a first lateral side and the cutting edge of a second half of the plurality of teeth is sharpened on a second lateral side, each tooth of the first half having two teeth of the second half planarly adjacent and each tooth of the second half having two teeth of the first half planarly adjacent.

An additional embodiment of the present invention is directed to a coulter blade wherein the blade circumference is based at least on one of: a desired rotation speed, a soil type, a desired tooth depth, a desired insert depth and wherein the discoidal coulter blade is further configured with a plurality of drive openings proximal with the blade hub.

An additional embodiment of the present invention is directed to a coulter blade wherein the insert angle of each of plurality of evenly spaced insert openings is one of: equal and unequal and wherein the discoidal coulter blade is further configured with a second plurality of evenly spaced insert openings and an associated second plurality of securably mounted inserts located in a circular pattern at a second radius from the blade hub, the second radius less than the first radius.

An additional embodiment of the present invention is directed to a coulter blade wherein the plurality of teeth and the plurality of inserts are further configured for at least one of: a specific soil type, a soil moisture content, a soil with embedded rocks, and a soil temperature.

An additional embodiment of the present invention is directed to a method for altering surface stubble and soil aeration, comprising: embedding a discoidal coulter blade within the soil, the discoidal coulter blade configured with a blade hub and a blade circumference, the discoidal coulter blade having a plane parallel to each diameter line of the discoidal coulter blade, the blade hub configured for detachably mounting the discoidal coulter blade to an implement; translating the discoidal coulter blade through the soil at a depth via the implement; cutting the surface stubble and soil via a plurality of teeth configured proximal to and integral with the blade circumference, each one of the plurality of teeth having a cutting edge and a back edge, the back edge longitudinally opposite the cutting edge, the cutting edge and the back edge linear with the plane, the cutting edge configured to cut the surface stubble and the soil, the back edge configured for driving the discoidal coulter blade rotationally parallel to the plane as the soil acts on the back edge; aerating the soil via a plurality of inserts sized to securably mount within a plurality of evenly spaced insert openings, the insert openings configured in a circular pattern at a first radius from the blade hub, the first radius being less than the blade circumference, each of the plurality of evenly spaced insert openings having an insert angle, the plurality of evenly spaced insert openings at the insert angle, each one of the plurality of inserts configured to securably mount within one of the plurality of evenly spaced insert openings, each one of the plurality of inserts sized to fill an associated one of the plurality of evenly spaced insert openings, each one of the plurality of inserts is configured to extend, from the discoidal coulter blade, a lateral distance normal to the plane, the plurality of inserts configured to alter the soil as a portion of the insert, which extends the lateral distance, rotationally and translationally interacts with the soil.

An additional embodiment of the present invention is directed to a system for altering surface stubble and soil aeration, comprising: an implement configured with a plurality of discoidal coulter blades, each of the plurality of discoidal coulter blades configured with a blade hub and a blade circumference, each of the plurality of discoidal coulter blades having a plane parallel to each diameter line of the discoidal coulter blade, the blade hub configured for detachably mounting the discoidal coulter blade to the implement, each of the plurality of discoidal coulter blades configured with a plurality of teeth configured proximal to and integral with the blade circumference, each one of the plurality of teeth having a cutting edge and a back edge, the back edge longitudinally opposite the cutting edge, the cutting edge and the back edge linear with the plane, the cutting edge configured to cut the surface stubble and the soil, the back edge configured for driving the discoidal coulter blade rotationally parallel to the plane as the soil acts on the back edge, each of the plurality of discoidal coulter blades configured with a plurality of evenly spaced insert openings configured in a circular pattern at a first radius from the blade hub, the first radius being less than the blade circumference, each of the plurality of evenly spaced insert openings having an insert angle, each of the plurality of discoidal coulter blades configured with a plurality of inserts sized to securably mount within the plurality of evenly spaced insert openings at the insert angle, each one of the plurality of inserts configured to securably mount within one of the plurality of evenly spaced insert openings, each one of the plurality of inserts sized to fill an associated one of the plurality of evenly spaced insert openings, each one of the plurality of inserts is configured to extend, from the discoidal coulter blade, a lateral distance normal to the plane, the plurality of inserts configured to alter the soil as a portion of the insert, which extends the lateral distance, rotationally and translationally interacts with the soil.

An additional embodiment of the present invention is directed to a method for altering surface stubble and soil aeration, comprising: means for embedding a discoidal coulter blade within the soil, the discoidal coulter blade configured with a blade hub and a blade circumference, the discoidal coulter blade having a plane parallel to each diameter line of the discoidal coulter blade; means for translating the discoidal coulter blade through the soil at a depth; means for rotationally driving a plurality of teeth configured proximal to and integral with the blade circumference; means for cutting the surface stubble and soil; means for rotationally and translationally driving a plurality of inserts sized to securably mount within a plurality of evenly spaced insert openings within the discoidal coulter blade, the insert openings configured in at least one circular pattern at a first radius from the blade hub, the first radius being less than the blade circumference.

BRIEF DESCRIPTION OF THE DRAWINGS

The numerous advantages of the present invention may be better understood by those skilled in the art by reference to the accompanying figures in which:

FIG. 21 is a flowchart for a method for altering surface stubble and soil aeration exemplary of an embodiment of the present invention;

DESCRIPTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

One goal of the present invention may include a device capable of cutting the soil with a minimum required Downward Pressure (DP). DP on tillage equipment may be directly proportional to force required to pull the tillage equipment through the field. A reduction in DP equals a corresponding reduction in force and thus, reduced fuel used to pull the equipment.

An additional goal of the present invention may include a coulter blade with a plurality of sharpened teeth, the teeth shaped to efficiently cut a substantial portion of stubble. The teeth may be of uniform shape or variable with angular position around the circumference of the blade.

An additional goal of embodiments of the present invention may be to aerate the soil with which the inserts of the blade may interact. Such aeration may prove beneficial to annual root growth as well as long term health of the soil.
Blade Size and Shape An exemplary embodiment of the present chosen for illustrative purposes may include a coulter blade of circular shape with a plurality of teeth configured to interact with chaff on the surface of the soil as well as the soil itself. This exemplary embodiment employs at least one circular row of inserts oriented normal to the surface of the blade and able to interact with the soil as the blade traverses the soil.

Figure 1:
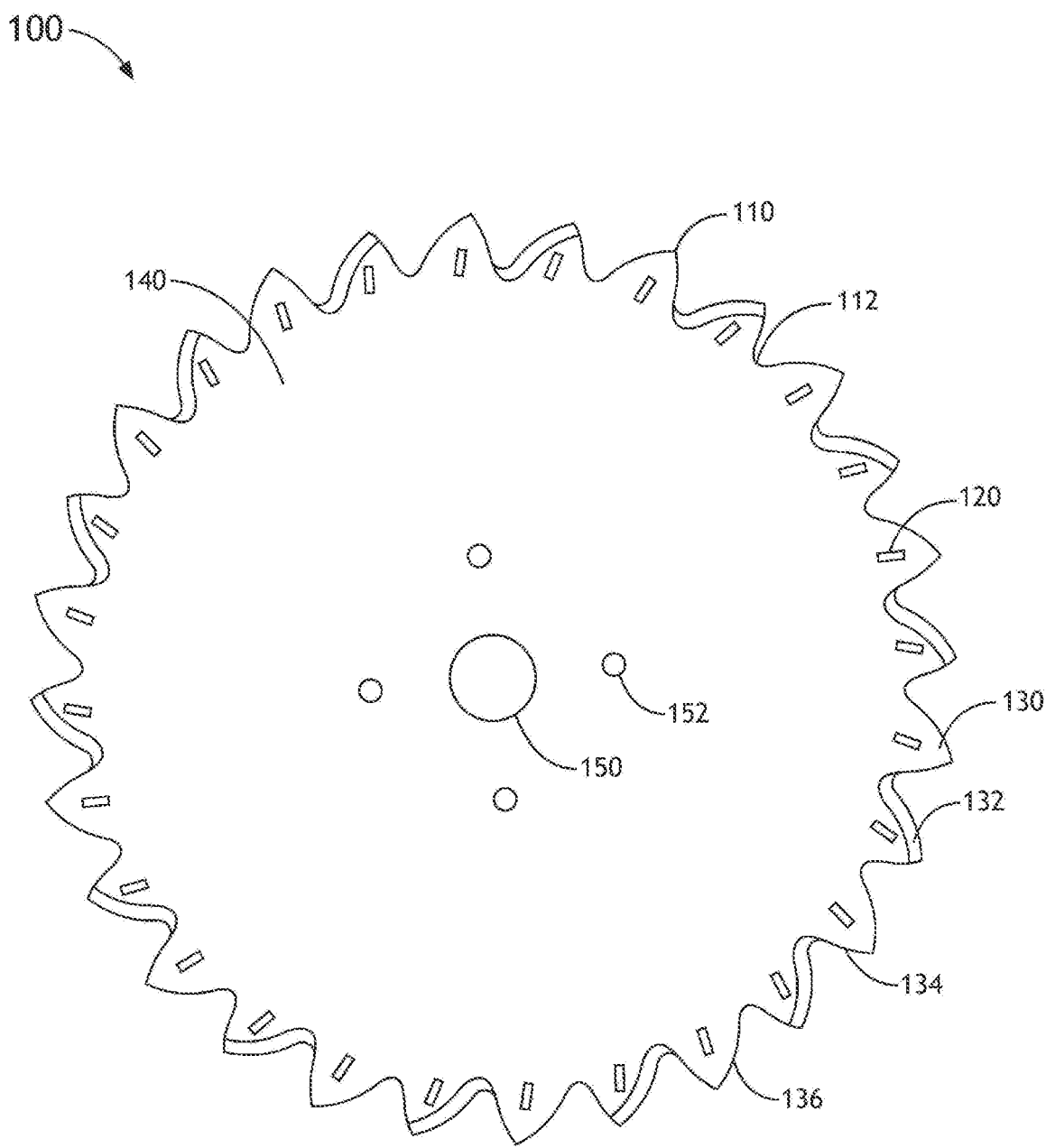
FIG. 1 is a diagram of a coulter blade with sized inserts exemplary of an embodiment of the present invention.

Referring to FIG. 1, a diagram of a coulter blade with sized inserts exemplary of an embodiment of the present invention is shown. A circular coulter blade 140 exemplary of the present invention may include a plurality of teeth 110 each tooth 110 having a tooth cutting edge 136 and tooth back 134. Between each tooth 110, a gullet 112 may retain specific qualities for tooth effectiveness. In embodiments, each tooth 110 is sharpened on opposite and alternate lateral sides 132, 130 to effectively eliminate lateral sidewall pressure as the circular coulter blade cuts the soil. In embodiments, the circular coulter blade 140 may be configured with a plurality of inserts 120.

In one embodiment, the circular coulter blade 140 is detachably mountable to a tillage machine capable of mounting and operating many coulter blades 140. Coulter blade 140 may be detachably mountable to the machine via blade hub 150 and drive holes 152. It is contemplated herein; a bearing or other well-known rotatable device may allow for free rotation of the coulter blade 140.

Rotation of the blade is preferably from right to left with the sabre shape of the blade cutting edge 136 impacting and cutting the stubble on the surface of the soil. As inserts 120 enter the soil, the rotational action of the inserts 120 may fracture and bring to the surface an amount of soil with which the insert 120 may interact. Additionally, soil proximal to the insert 120 may also be fractured and brought to the surface sue to energy transferred from the insert 120 to the adjacent soil.

Figure 2:
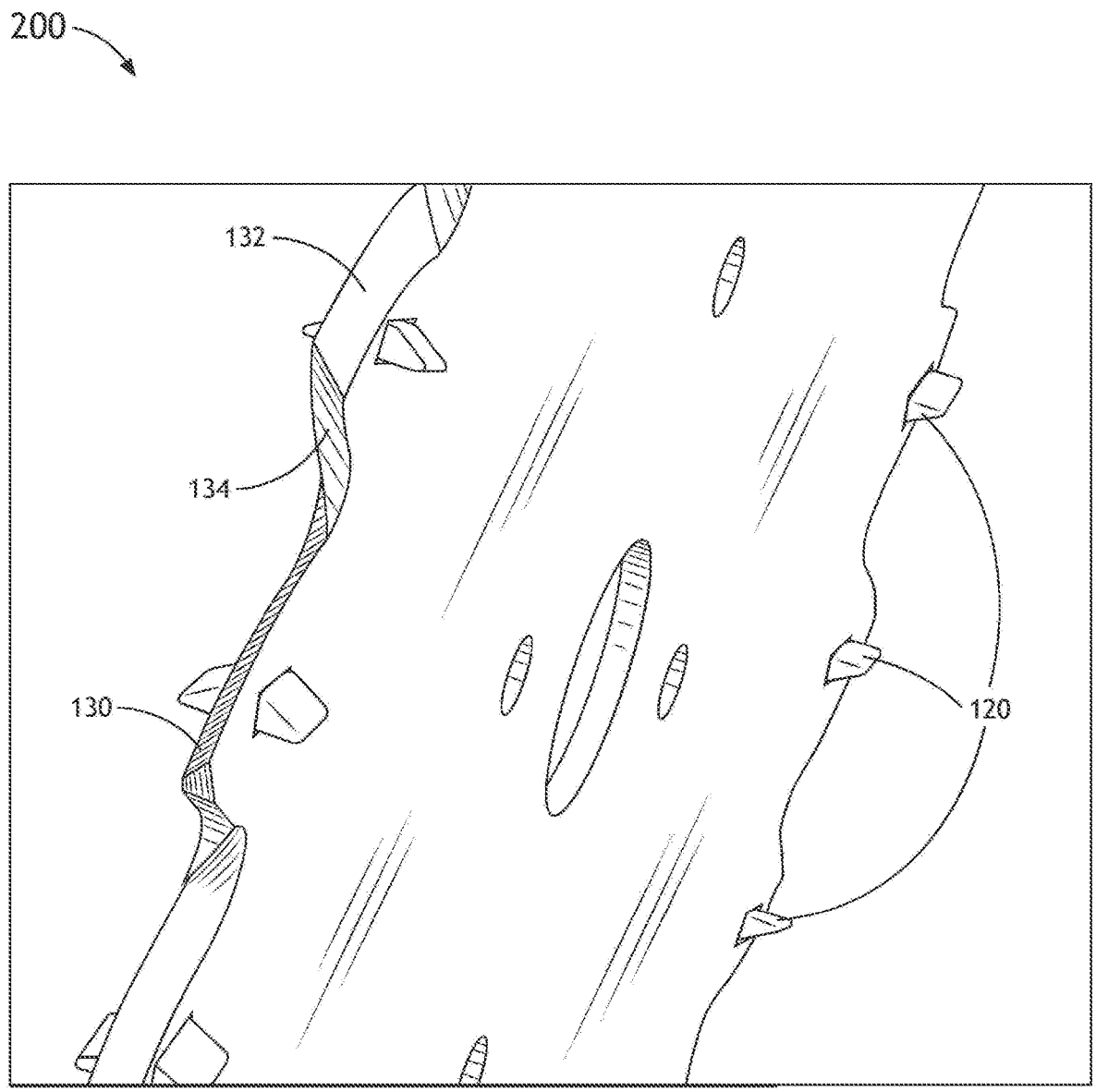
FIG. 2 is a detail diagram of a coulter blade with sized inserts exemplary of an embodiment of the present invention.

Referring to FIG. 2, a detail diagram of a coulter blade with sized inserts exemplary of an embodiment of the present invention is shown. Sized inserts 120 may be clearly shown extending laterally from the circular coulter blade. Teeth 110 sharpened on a first lateral side 132 are adjacent to teeth 110 sharpened on a second lateral side 130. Tooth back 134 may help drive rotation of the coulter blade 140 as it interacts with the soil.

Figure 3:
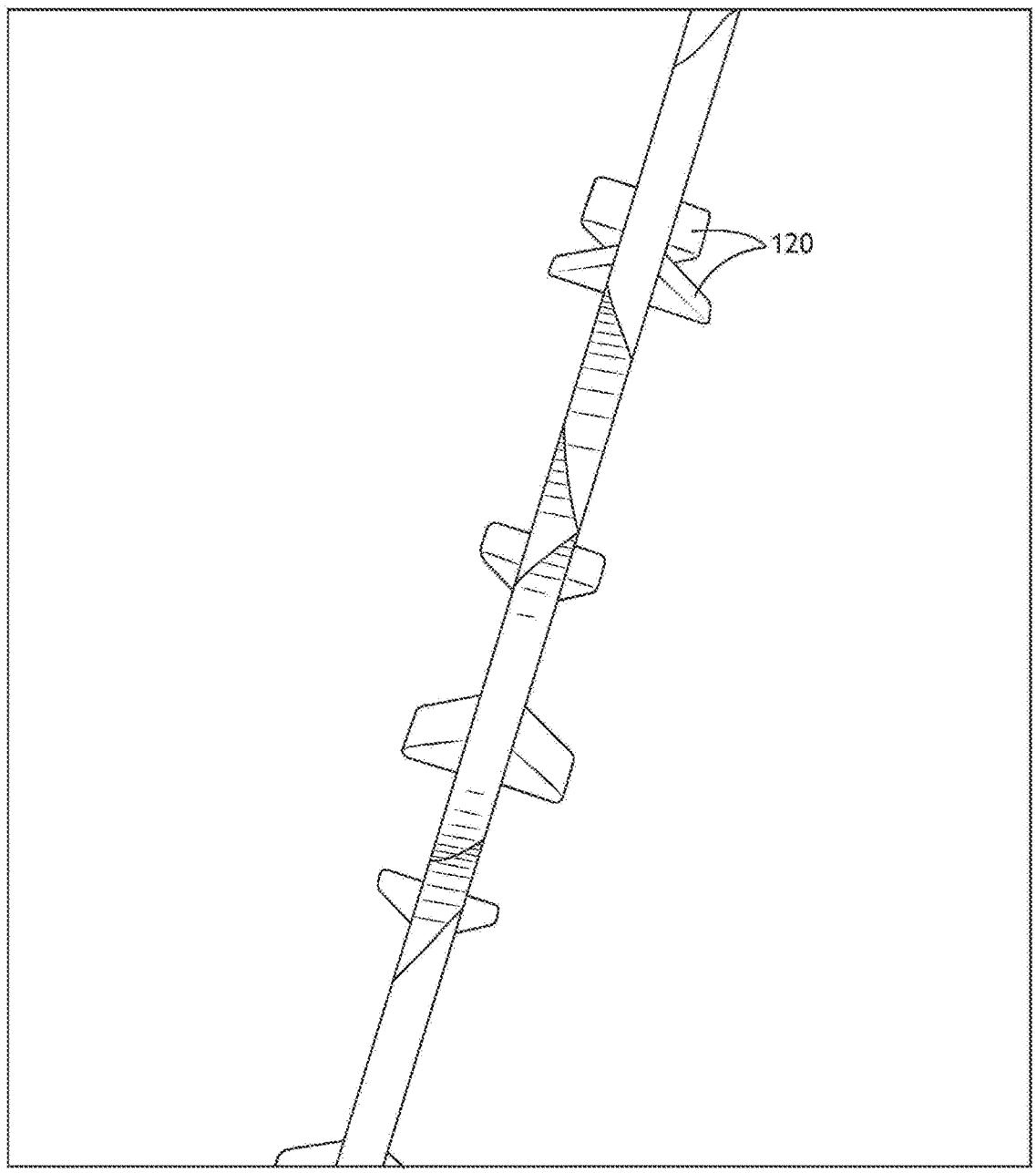
FIG. 3 is an detail side view diagram of a coulter blade with sized inserts exemplary of an embodiment of the present invention.

Referring to FIG. 3, a detail side view diagram of a coulter blade with sized inserts exemplary of an embodiment of the present invention is shown. Inserts 120 may extend laterally from the coulter blade 140. The shape of inserts 120 may depend upon the compaction and moisture level associated with the soil type of intended interaction. Shaped inserts 120 may be seen protruding from opposite sides of the coulter blade 140. Preferably, tapered inserts 120 of variable size may be incorporated to manipulate a desired amount of soil.

Within the scope of the present invention, coulter blade 140 may be constructed of a variety of material suitable for structural integrity while embedded in the earth providing earth aeration. In one embodiment, a coulter blade 140 of the present invention may be constructed of hardened steel such as that manufactured by "Hardox." One product labeled "Hardox 500" may be particularly suitable for applications within the scope of the present invention.

Skilled artisans will recognize embodiments of the present invention may be manufactured from a variety of materials capable of abrasion resistance, long wear under stress, and able to be formed to the shapes required herein.

Variable sized inserts 120 placed proximal to the teeth 110 of the coulter blade 140 interact with the soil allowing the coulter blade 140 sidewall to remain nearly free from soil contact. As the coulter blade 140 rotates, each tooth 110 cuts into the soil and each insert 120 enters the soil at the desired angle. As the coulter blade 140 rotates, the insert 120 also rotates about the blade hub 150 and penetrates the soil. This insert 120 rotation and translation causes the soil with which the insert is in contact to become fractured and moved. As the blade hub 150 translates in a forward direction, the teeth and inserts 120 rotate about the hub causing the inserts 120 to lift soil to the surface. Depending on the depth of the coulter blade 140, the insert 120 rotational interaction with the soil may be increased (greater depth) or decreased (lesser depth).

An additional goal of the present invention may include leveling of the soil surface for optimal planting of a crop. In embodiments, the variable tooth coulter blade 140 may interact with the soil where tire tracks have compacted the soil over time. As the teeth 110 cut the stubble and soil, the inserts 120 interact with, aerate and loosen the compacted soil.

A further goal of the present invention may include aeration of the soil without removing large quantities of subsoil to the surface. For example, a concave blade may remove large clods or clumps of soil to the surface and may cause an unrecoverable moisture loss as well as undesirable large cavities below the surface. In addition, large clumps or clods of soil may remain unusable for over one growing season. Embodiments of the present invention may be configured to sufficiently aerate the soil with minimum void creation while leaving soil and root systems intact.

Embodiments of the present invention may enable tillage and aeration of the soil without removal of a previous root system. A previous root system may allow for organisms to breakdown and deposit the remnants usable for the next crop. Embodiments of the present invention may cut the root system without removing the root system from below the surface. This clean cut may allow for temperature movement, for water movement and increased aerobic flow to allow for organic organisms to thrive.

Tooth Size and Shape

Figure 4:
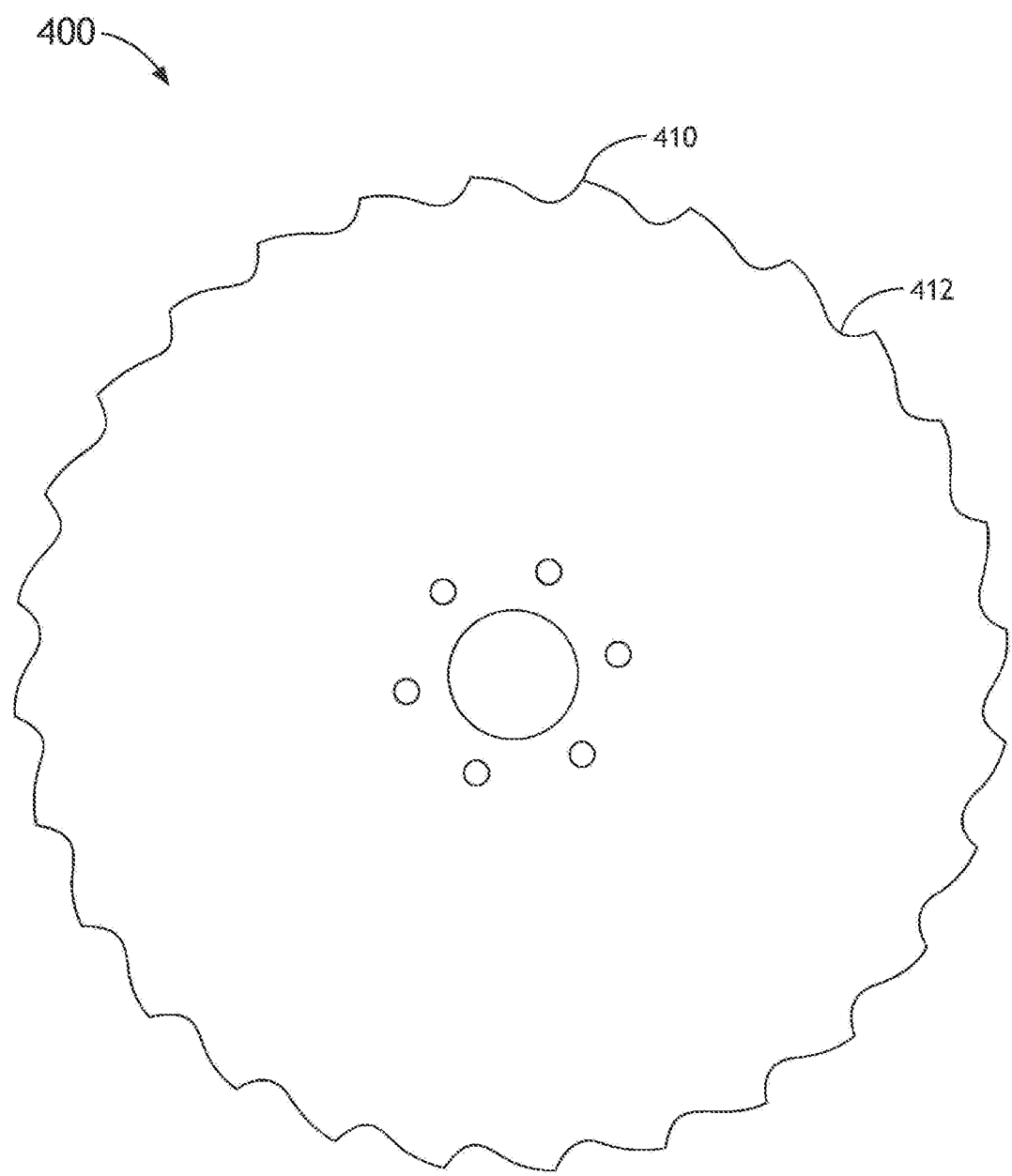
FIG. 4 is a diagram of a 28 tooth embodiment configured for rocky soil exemplary of an embodiment of the present invention.

Referring to FIG. 4, a diagram of a 28 tooth embodiment configured for rocky soil exemplary of an embodiment of the present invention is shown.

It is contemplated herein; the size and shape of each tooth may be altered for optimal performance for a particular type of soil. For example, in rocky soil, an operator may desire a shorter tooth 410 enabling the teeth to withstand a rock impact whereas in sandy soil, an operator may prefer a longer tooth to enable greater stubble cutting while offering optimal soil aeration. A rounded tooth gullet 412 may enable a push of the rock to one side of the coulter blade 140 resisting breakage due to rock impact.

It is further contemplated herein; tooth size and shape may be optimally configured for each of a plurality of soil types encountered by an operator. For example, a coulter blade 140 for rocky soil may possess a specific size and shape of tooth, a coulter blade 140 for non-rocky soil will possess a variant of the size and shape of tooth. While a coulter blade 140 for peat type soil may be optimally sized for penetration, a tooth for red clay or gumbo may be sized differently. Similarly, a coulter blade 140 designed for wet or dry soil may be optimally sized for proper aeration of the specific type of soil.

Figure 5:
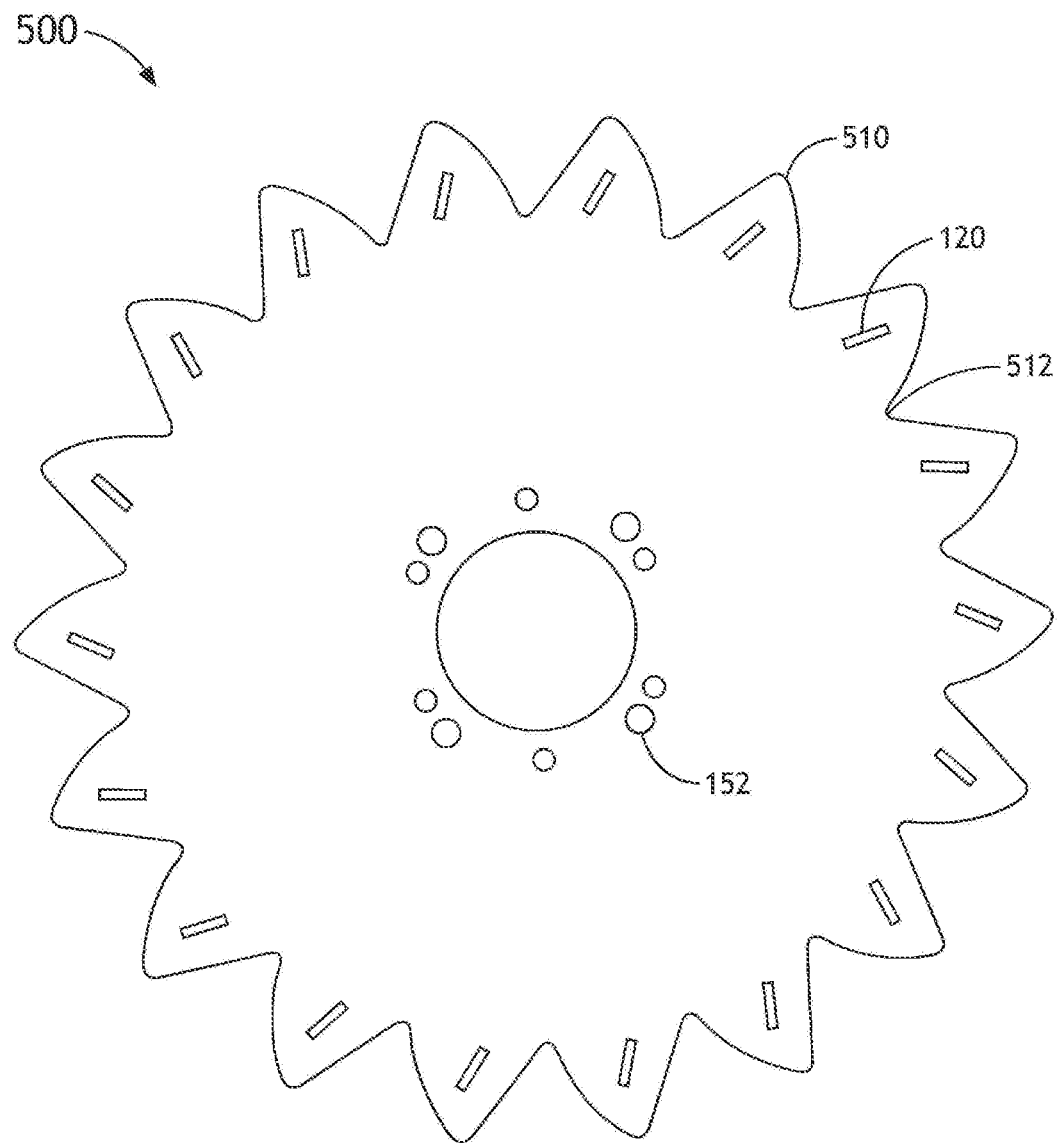
FIG. 5 is a diagram of an exemplary coulter showing 18 long teeth and an insert a variable angle exemplary of an embodiment of the present invention.

Referring to FIG. 5, a diagram of an exemplary coulter showing 18 long teeth and an insert a variable angle exemplary of an embodiment of the present invention is shown. An 18 tooth 510 design with inserts 120 may enable specific application in soft soil types. Tooth gullet 512 may be slightly rounded to continue a cut began by the cutting edge 136.

Drive openings 152 may enable a plurality of applications including detachably mounting to an existing implement. For example, one embodiment of the present invention may replace a pair of disc elements operating on a planter implement to open a planting trench. Embodiments herein may be specifically sized to replace elements currently used in operation.

Tooth Number

In embodiments, the number of teeth 510 is sufficient to ensure a cutting edge 136 may impact the soil without leaving surface stubble untouched. More specifically, each tooth begins cutting where the previous tooth enters the soil.

The tooth back 134 may be specifically shaped to pull the coulter blade 140 into the soil and maintain the rotation of the coulter blade 140. Much like a water wheel, each individual tooth back 134 provides the drive for the coulter blade 140 to rotate and minimize coulter blade 140 slippage. For example, a flat tooth back 134 may enable the desired drive force to cut the stubble and the soil while a flared or tooth back of increased surface area may enable a greater drive force if required.

In embodiments, the angle of tooth cutting surface may be altered for specific types of soil. For example, in rocky soil, the cutting edge 136 of each tooth may be lengthened to enable a pushing action as the cutting edge 136 of the tooth impacts the rock. In embodiments, a longer tooth may efficiently cut GMO stubble more effectively than a shorter tooth. A tooth measuring approximately three inches in length may allow for an efficient cut.

Figure 6:
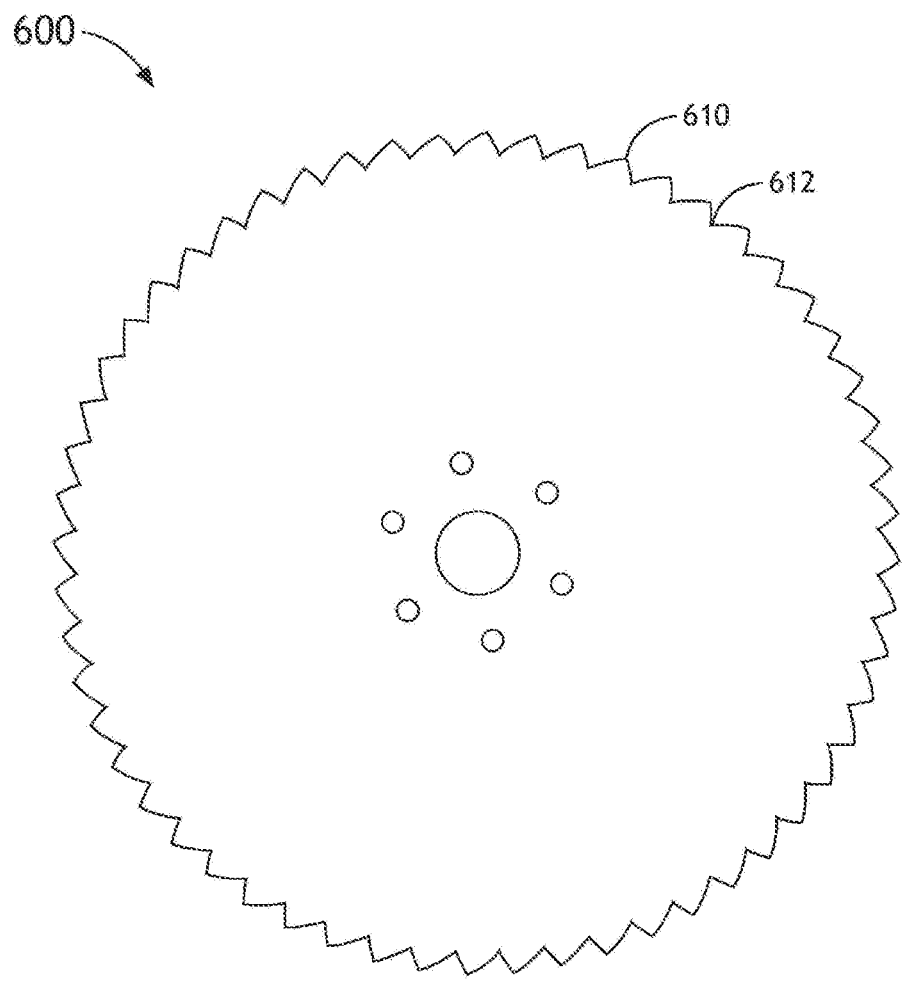
FIG. 6 is a diagram of a 56 tooth embodiment showing a sharp gullet exemplary of an embodiment of the present invention.

Referring to FIG. 6, a diagram of a 56 tooth embodiment showing a sharp gullet exemplary of an embodiment of the present invention is shown. In embodiments, a shorter tooth length with increased tooth numbers may enable an operator to achieve the desired tillage effect. For example, a short tooth 610 with a sharpened tooth gullet 612 may enable an accurate cut of a smaller gauge stubble such as oat stubble or wheat stubble.

Figure 7:
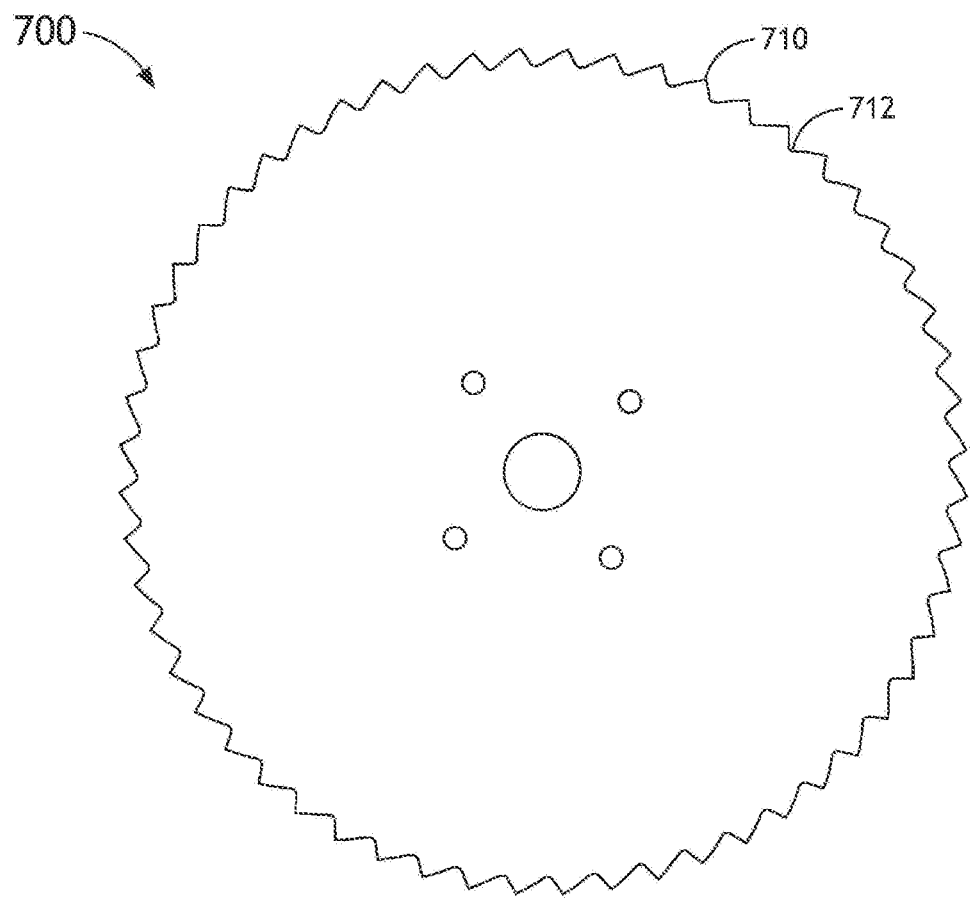
FIG. 7 is a diagram of a 56 tooth embodiment showing a rounded gullet exemplary of an embodiment of the present invention.

Referring to FIG. 7, a diagram of a 56 tooth embodiment showing a rounded gullet exemplary of an embodiment of the present invention is shown. In addition, a shorter tooth 710 with a rounded tooth gullet 712 may enable a sharpened tooth gullet 712 for increased cutting edge 136 surface area.

Figure 8:
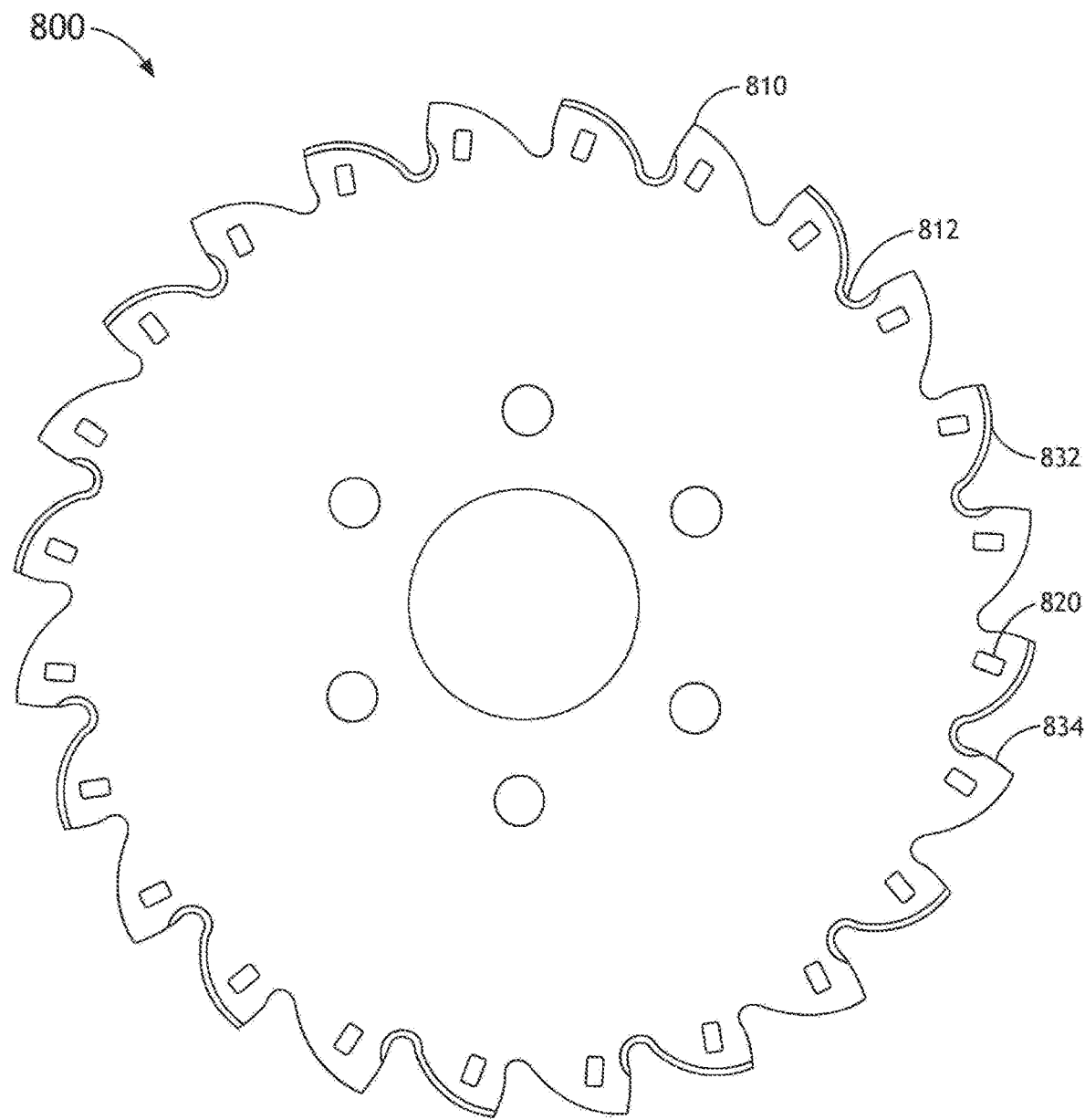
FIG. 8 is a diagram of an exemplary 24 tooth coulter blade with associated inserts in accordance with an embodiment of the present invention.

Referring to FIG. 8, a diagram of an exemplary 24 tooth coulter blade with associated inserts in accordance with an embodiment of the present invention is shown. In embodiments, the sabre tooth cutting edge 136 of each tooth 810 may remain unsharpened for optimal performance in specific types of soil. Alternatively, a coulter blade 140 designed for minimum till in heavy soil may be configured with teeth 810 optimally shaped for desired tillage and aeration. Additionally, a system 800 designed for low Cation-Exchange Capacity (CEC) soil and medium tillage may be optimally configured with teeth 810 shaped for the desired tillage. Additionally, a coulter blade 140 designed for full till/void creation for fertilizer injection may possess tooth 810 qualities and insert 820 size for optimal performance.

In embodiments, a cutting edge 136 of a sharpened tooth may possess a concave cutting surface as each tooth is sharpened. In embodiments, a tooth 810 as well as the tooth gullet 812 may be sharpened in an optimal configuration for the anticipated type of stubble. Additionally, the cutting surface of each may be optimally shaped in a sabre or curved shape 832 creating a friction cut as opposed to a pressure cut.

In FIG. 8, travel of the coulter blade 140 may be from left to right where the curved sabre side 832 of each tooth 810 is able to cut surface stubble a an optimum angle as the system 800 is operated and the optimum depth.

A curved cutting edge 832 on each tooth may allow efficient cut of GMO refuse stubble material. Preferably, each tooth 810 is sized to maintain a cutting surface proximal to the cutting surface of the adjacent tooth. For example, a first tooth may cut a two inch surface of the soil while the adjacent tooth will cut the next two inches of soil with no gap in cut surface of the soil.

Figure 9:
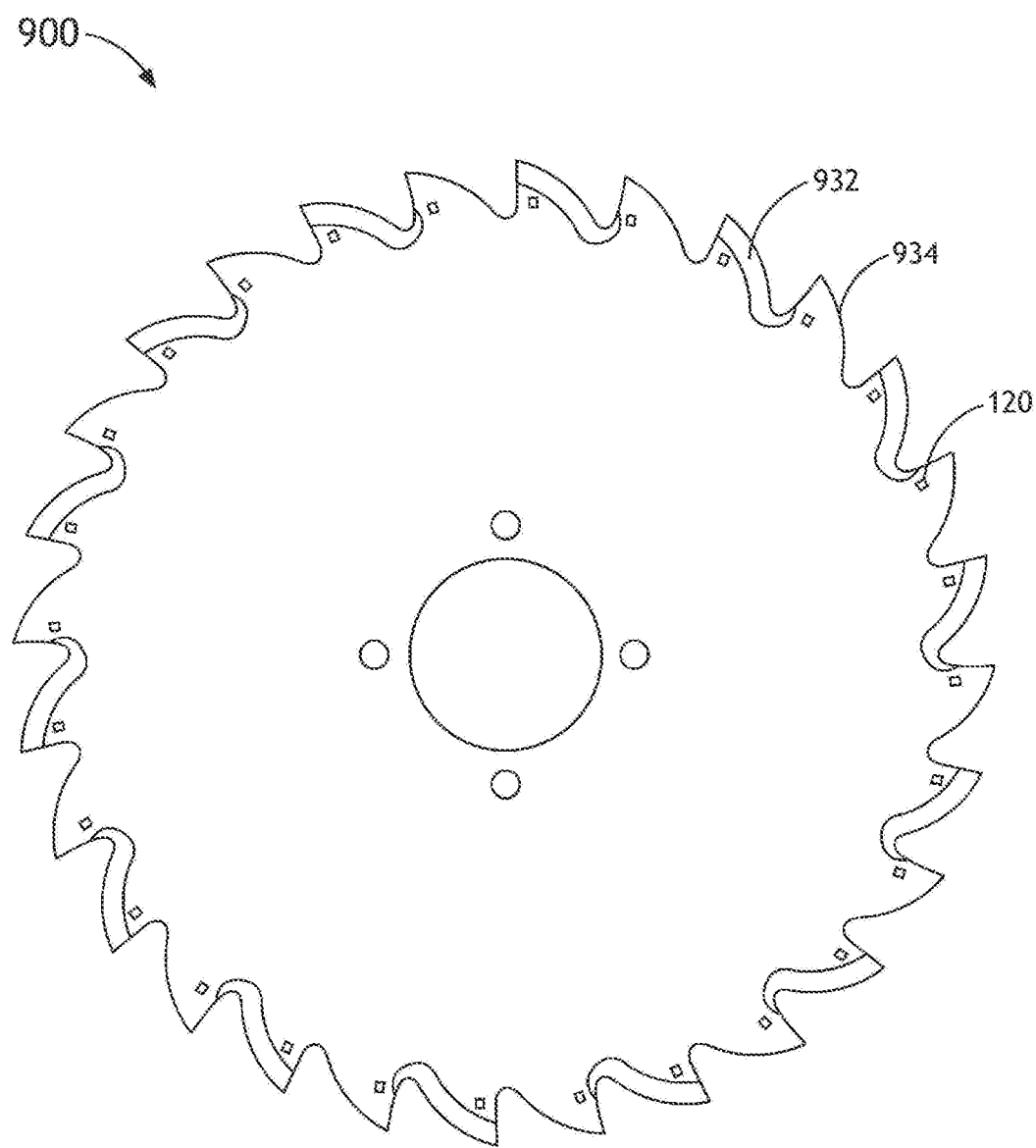
FIG. 9 is a diagram of a blade with associated 28 teeth and 28 inserts in accordance with an embodiment of the present invention.

Referring to FIG. 9, a diagram of a blade with associated 28 teeth and 28 inserts in accordance with an embodiment of the present invention is shown. Preferably, adjacent teeth are sharpened on alternating sides 932 934 to eliminate sidewall force as the teeth interact with the soil. As each tooth enters and cuts the soil, skilled artisans will recognize the angle of sharpening will create a lateral force away from the sharpened surface. Embodiments of the present invention may offset this lateral force with and opposite lateral force of the adjacent tooth.

Figure 10:
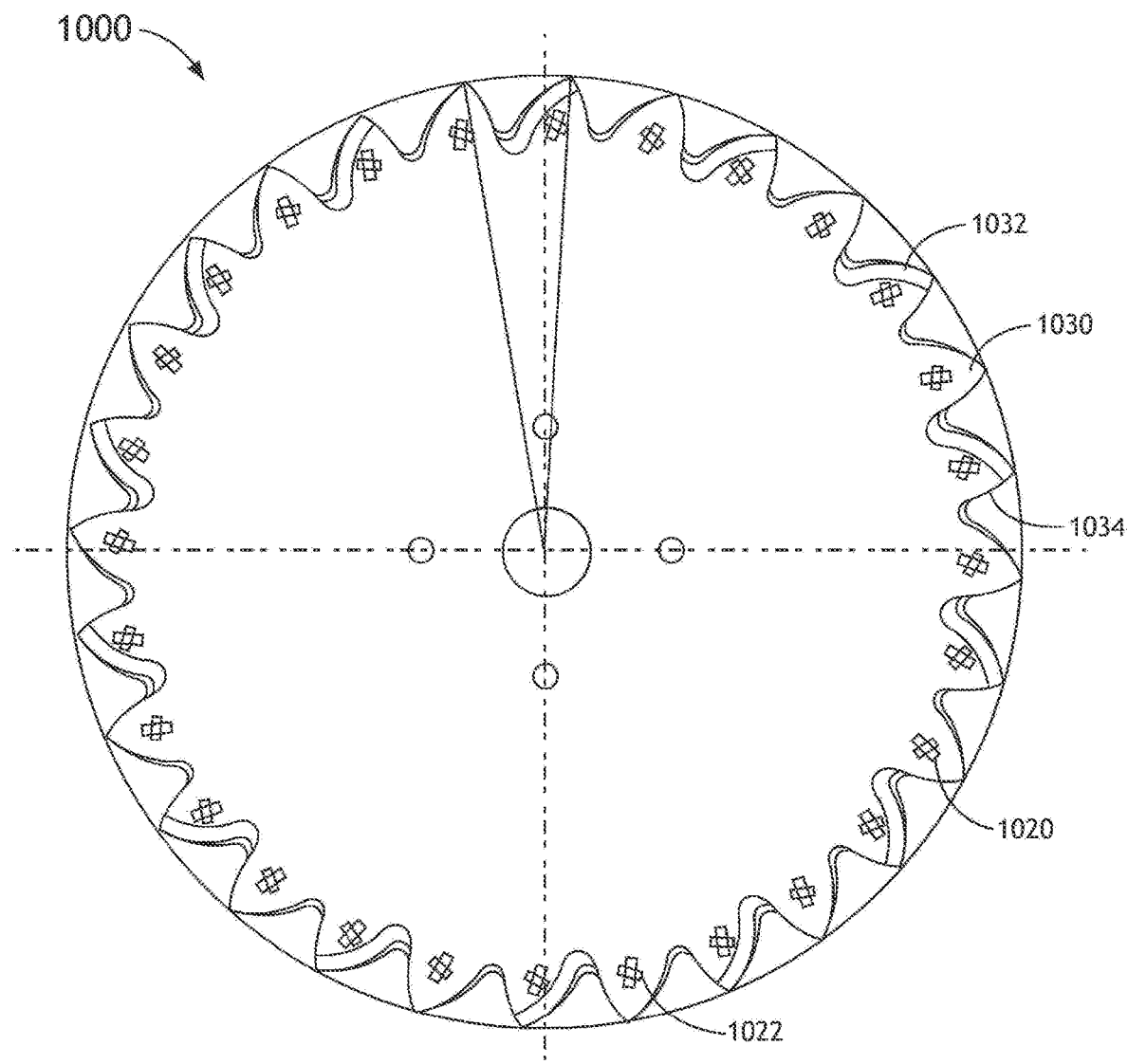
FIG. 10 is a diagram of a blade with associated 28 teeth and 28 angled inserts in accordance with an embodiment of the present invention.

Referring to FIG. 10, a diagram of a blade with associated 28 teeth and 28 angled inserts in accordance with an embodiment of the present invention is shown. Insert angle may be specifically designed for the type of soil and for a desired angle of insert soil penetration. As system 1000 moves from right to left and tooth back 1034 pulls the coulter blade 140 through the soil, insert 1022 may penetrate the soil at nearly a 90 degree angle and exit the soil at approximately 30 degree angle relative to the soil surface. Should system be fitted with insert 1020, insert 1020 may penetrate the soil at approximately a 30 degree angle but exit the soil at a 45 degree angle. This variable angle may increase the desired subsoil removed to the surface as well as increase the fracturing effect of the inserts as they interact with the soil.

Figure 11:
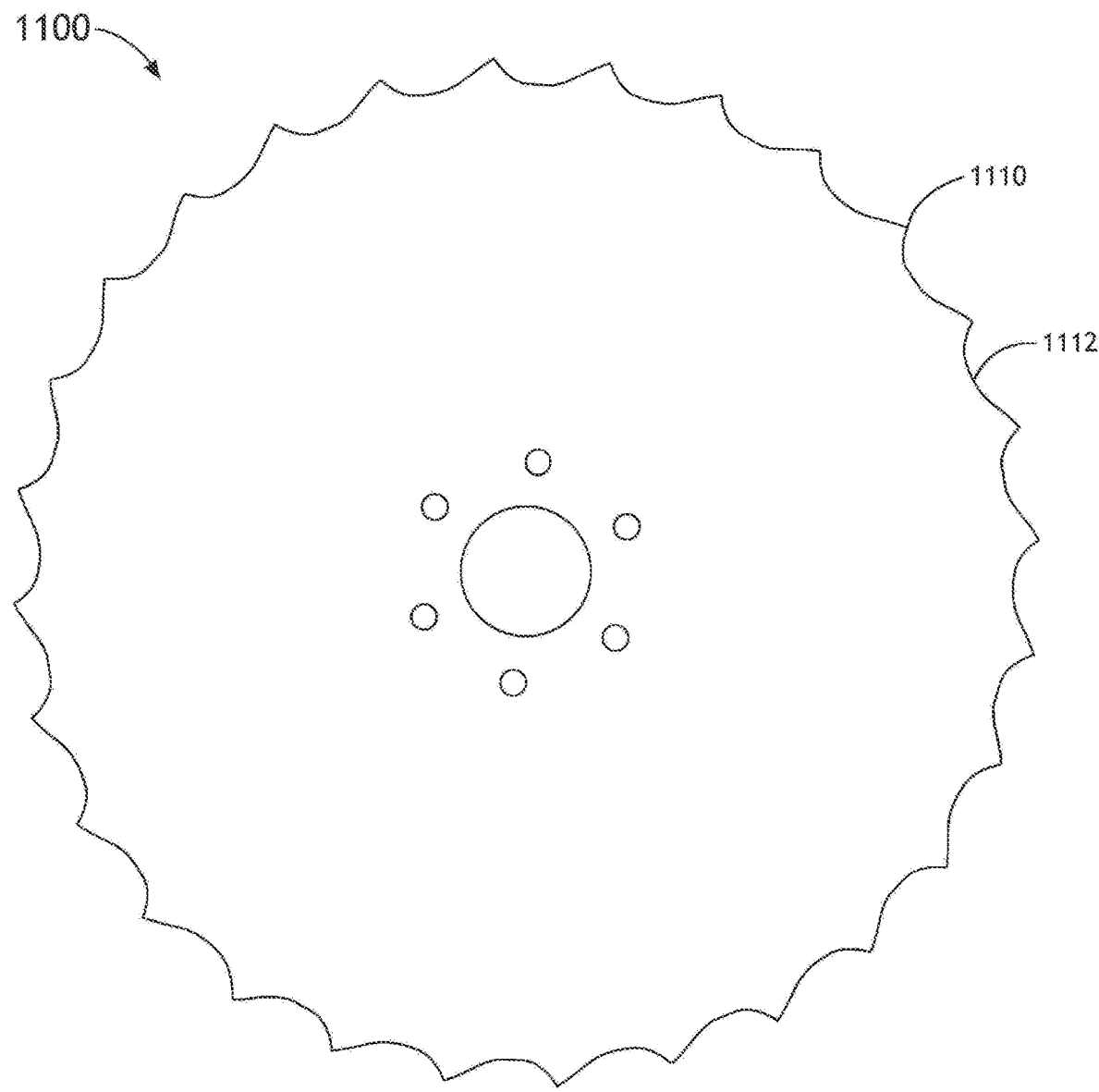
FIG. 11 is a diagram of an exemplary coulter blade with associated 28 teeth of shorter gullet depth in accordance with an embodiment of the present invention.

Referring to FIG. 11, a diagram of an exemplary coulter blade with associated 28 teeth of shorter gullet depth in accordance with an embodiment of the present invention is shown. Shortened teeth 1110 and shallow tooth gullet 1112 may decrease possible tooth breakage as coulter blade 140 may interact with soil of hardened or rocky nature.

Figure 12:
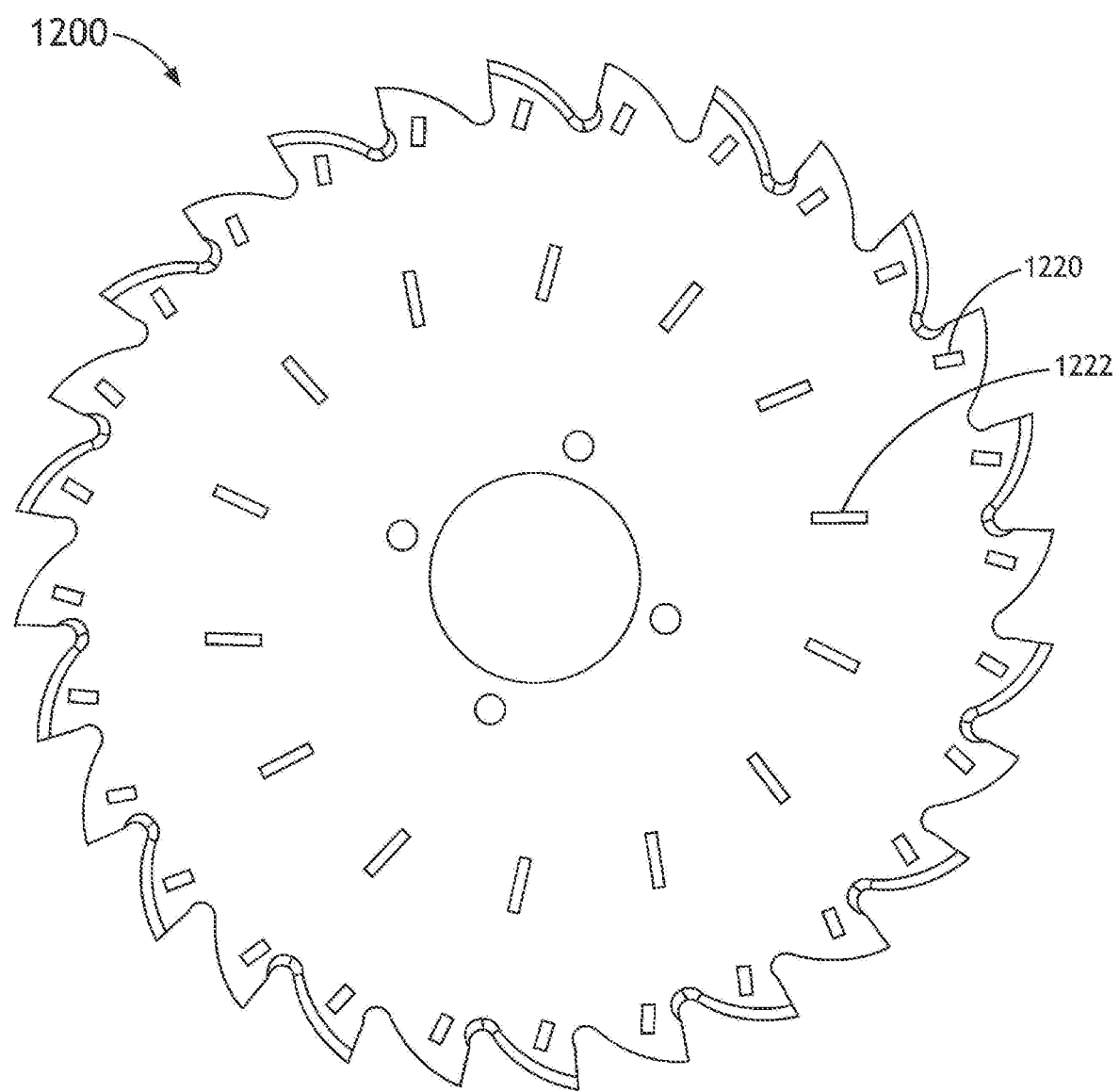
FIG. 12 is a diagram of an exemplary coulter blade with 28 teeth and associated outer and inner inserts in accordance with an embodiment of the present invention.

Referring to FIG. 12, a diagram of an exemplary coulter blade with 28 teeth and associated outer and inner inserts in accordance with an embodiment of the present invention is shown.

Insert Location

It is further contemplated herein; variable insert 1220 location may offer desired tillage and aeration qualities capable of the variable tooth coulter blade 140. An insert 1220 positioned distally from the hub of the coulter blade 140 may provide a greater tillage effect for creating a void capable of receiving an additional element, for example, a planting device placing seeds into the void and a fertilizing device filling the void with a fertilizer. An additional plurality of inserts 1222 may be located at a second radius from the blade hub 150 to allow an operator more flexibility in soil aeration. For example, an inner circle of inserts 1222 may allow for surface soil aeration while the outer row of inserts 1220 may allow for subsoil aeration. It is contemplated herein; multiple circles of inserts may function within the scope of the present invention, each circle providing separate function at the desired depth of operation.

For example, at an exemplary depth where proximal inserts 1222 are embedded in the soil, both the proximal insert 1222 and the distal insert 1220 are interacting with the soil. However, if an operator were to reduce the depth, the entirety of the distal insert 1220 impacts the soil while only a portion of the proximal insert 1222 impacts the soil.

Referring to FIGS. 13a-13E, diagrams of exemplary coulter blades with variable tooth number, tooth size, insert number and size, and gullet depth in accordance with embodiments of the present invention are shown. Inserts 120 may be of variable size and shape. Further, inserts 120 may be placed at a plurality of locations within the coulter blade 140 to optimally impact the type of soil anticipated.

Figure 13A:
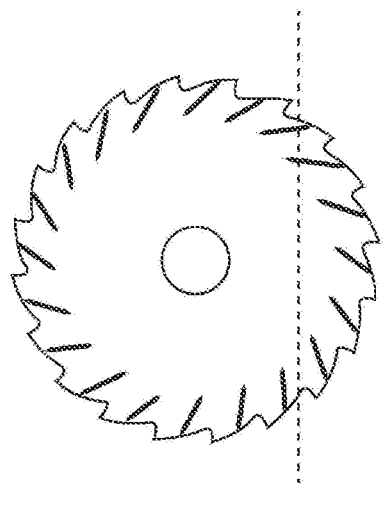
FIGS. 13A-13E are diagrams of exemplary coulter blades with variable tooth number, tooth size, insert number and size, and gullet depth in accordance with embodiments of the present invention.
Figure 13B:
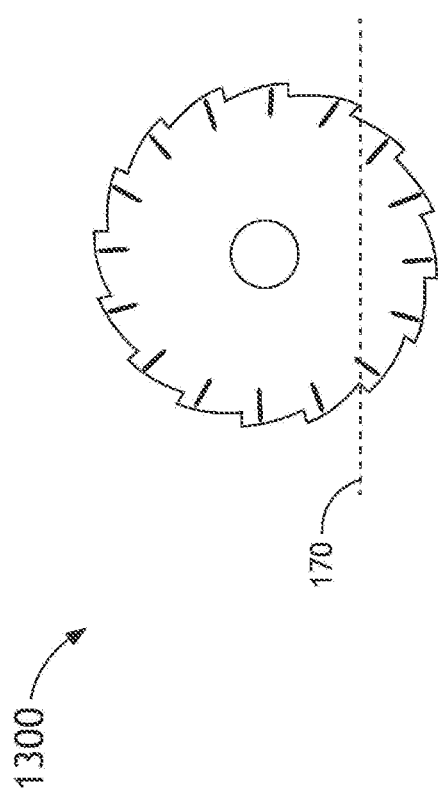
Figure 13E:
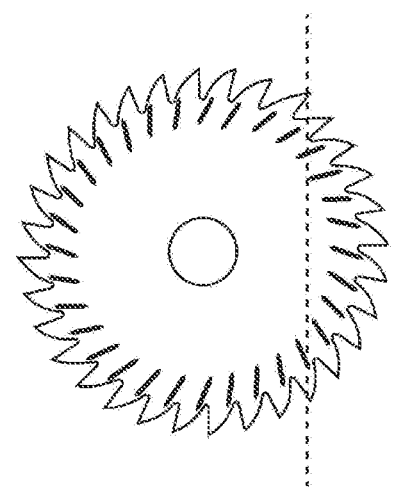
Figure 13D:
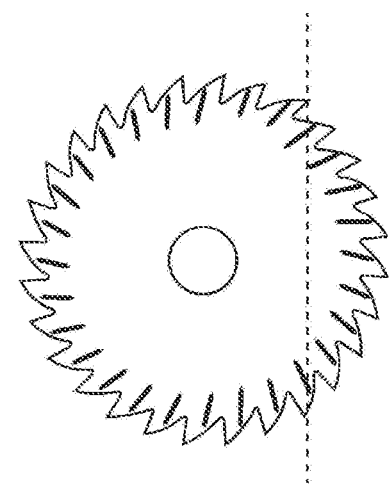
Figure 13C:
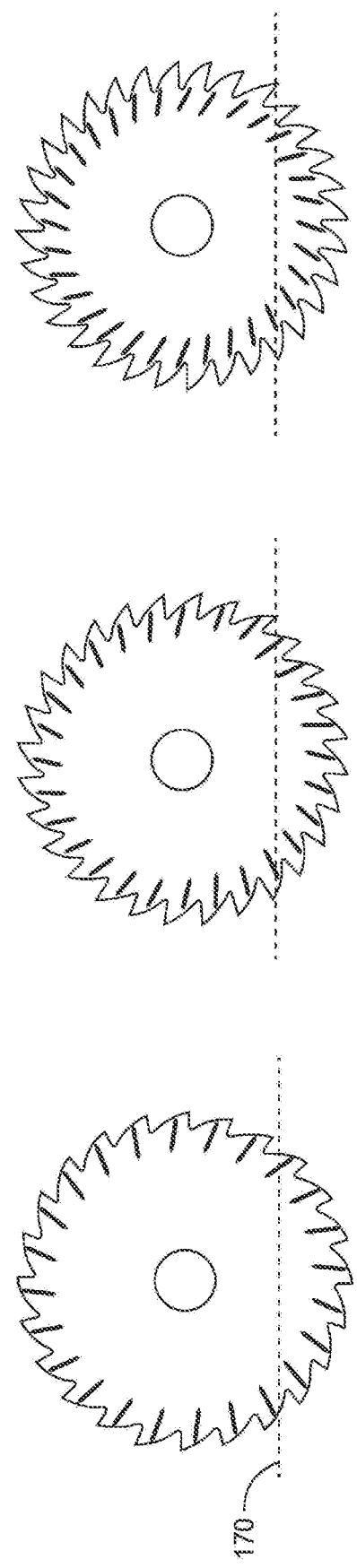

It is contemplated a plurality of designs of coulter blades 140 having a variety of number of teeth and inserts 120 may be incorporated within the scope of the present invention. Without limitation, each embodiment shown in FIGS. 13A, 13B, 13C, 13D, and 13E may be one example of many contemplated herein. FIG. 13A shows an exemplary 16 tooth design, each tooth having an optimum tooth cutting edge to cover the circumference of the coulter blade 140. FIG. 13B shows a 20 tooth design with additional surface area available for cutting. FIG. 13C shows a 24 tooth design with 24 inserts 120 capable of impacting a greater quantity of soil. FIG. 13D shows a 28 tooth design with as many inserts 120. FIG. 13E shows a 32 tooth and insert 120 design of the present invention. Alternatively, in FIG. 13E, inserts 120 may be exemplarily placed at every other tooth allowing for 32 teeth and 16 inserts 120.

Skilled artisans will realize with more teeth may come additional surface area for cutting various sizes of stubble. However, more teeth also may contribute to tooth breakage leading to a balance between tooth number and the type of soil anticipated by the operator.

Insert Angle

Figure 14:
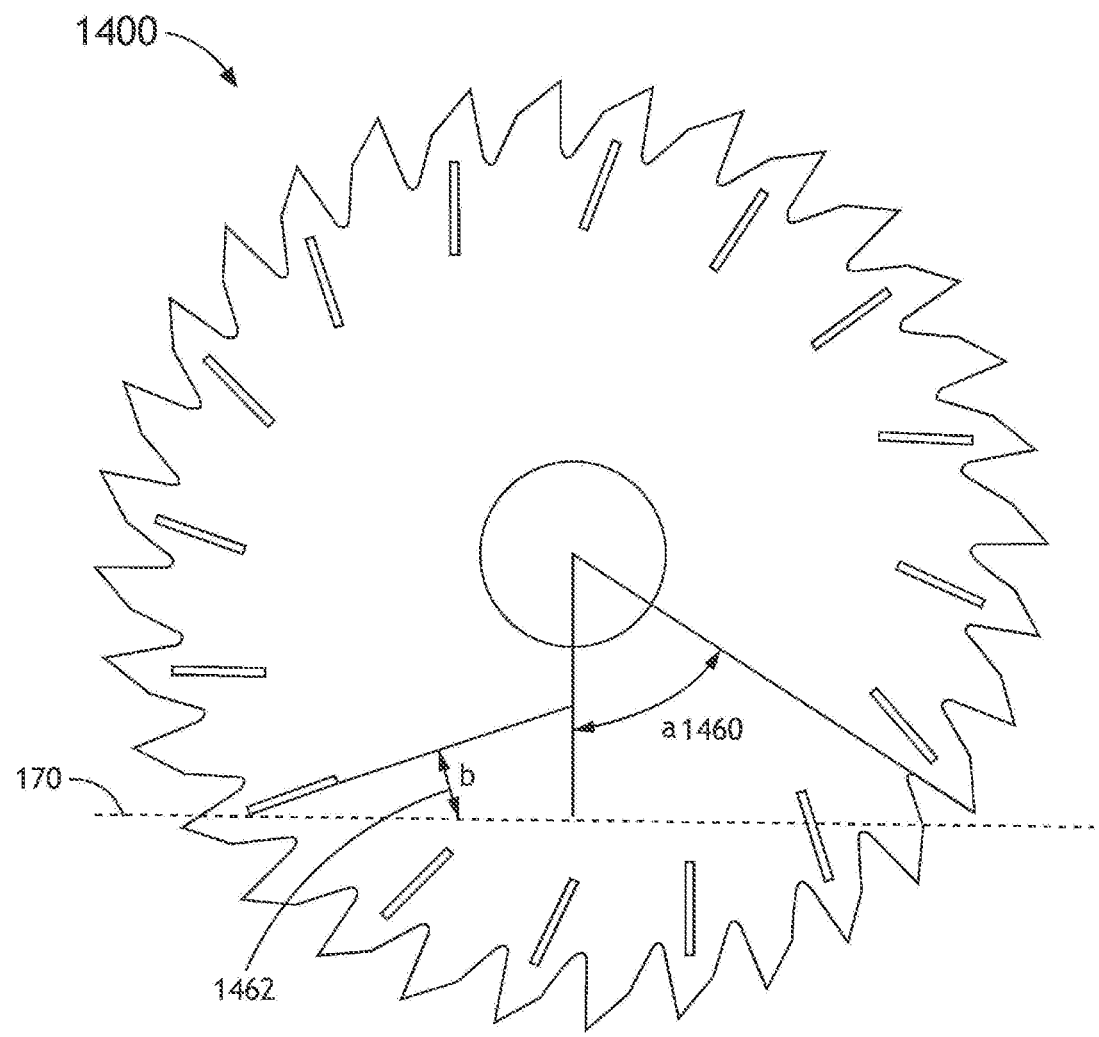
FIG. 14 is a diagram of an exemplary 32 tooth embodiment indicating insert rotational motion as the insert traverses the soil in accordance with an embodiment of the present invention.

Referring to FIG. 14, a diagram of an exemplary 32 tooth embodiment indicating insert rotational motion as the insert traverses the soil in accordance with an embodiment of the present invention is shown. The angle b 1462 of insert 120 placement may also be manipulated for optimal performance. As exemplarily indicated, inserts 120 are positioned at angle b 1462 approximately 30 degrees from the surface. As the coulter blade 140 moves from right to left here, inserts 120 may vertically transverse into the soil to the maximum depth vertically beneath the blade hub 150. As the coulter blade 140 moves left, the insert 120 decreases in depth and exits the soil. During this down then up translation, insert 120 is also undergoing rotation about the blade hub 150 equal to double the angle of impact a 1460. With a 30 degree penetration angle and a 120 degree exit angle, the soil touched by insert 120 is impacted and fractured based on the rotation.

With an alteration of the angle of the insert 120, the operation of the insert 120 in contact with the soil is altered. For example, an insert 120 angled to penetrate the soil at a 90 degree angle of penetration may aerate differently than an insert 120 placed to enter the soil at a 45 degree angle of penetration. A slight change in insert angle b 1462 may greatly influence the amount of soil brought to the surface after coulter blade 140 interaction. In embodiments, an insert 120 may penetrate the surface of the soil at a relatively flat 0 degrees from horizontal and exit the surface of the soil after approximately 135 degrees of rotation.

For example, an operator with a CEC of 20 may have a large amount of surface stubble where the operator desires more dark soil on the surface located in a northern climate. In this case, the angle b 1462 of the insert 120 may be optimally positioned for greater soil movement to the surface. For example, an insert 120 with in impact angle b 1462 of 30 degrees may enter the soil 170 at 30 degrees and rotate to 120 degrees before fully exiting the soil. This rotation of the insert 120 as well as the change in depth (from zero to the desired depth (here an exemplary four inches)) of the insert.

It may or may not be necessary to alter the size and shape of the insert 120 as the angle change of the insert 120 may be sufficient to transfer the desired amount of soil to the surface. For example, a curved insert may be able to act in a shoveling manner to enter the soil at 90 degrees and exit the soil at a nearly level orientation to maximize the soil brought to the surface.

In another embodiment, the operator in heavy gumbo with tight soil may desire simply more tillage. In this case, the insert 120 may be widened to create more surface area for the insert 120 to interact with the soil.

It is contemplated herein, a prescription insert 120 designed for a specific type of soil may enable an operator the flexibility to attain the desired till and aeration. A first operator tilling a first specific type of soil may desire a first size, shape, and angle of insert 120 while a second operator tilling a second specific type of soil may desire a second size, shape, and angle of insert 120.

Figure 15A:
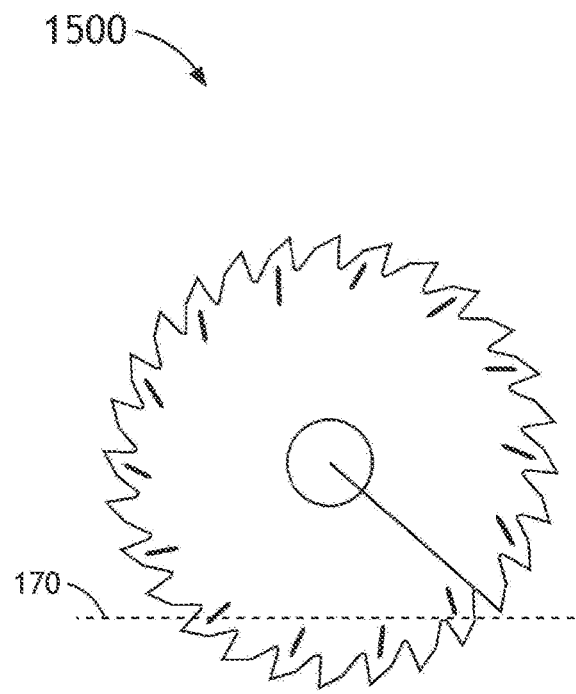
FIGS. 15A-15D are diagrams of insert effect on the soil at various blade depths in accordance with embodiments of the present invention.
Figure 15B:
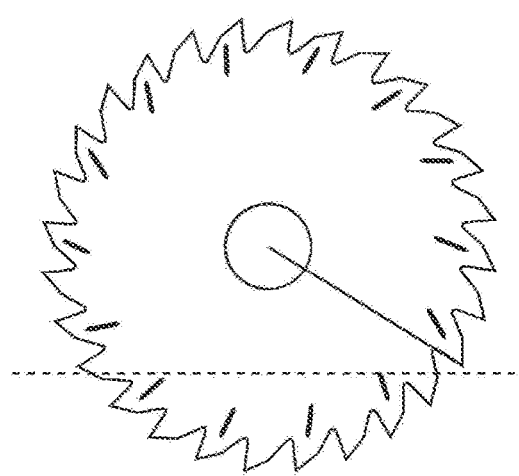
Figure 15C:
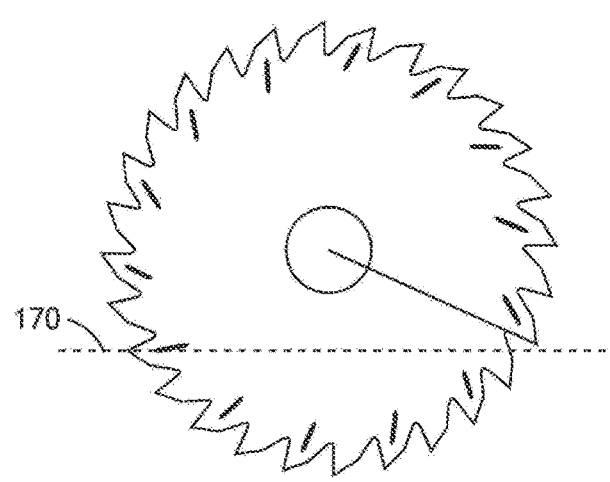
Figure 15D:
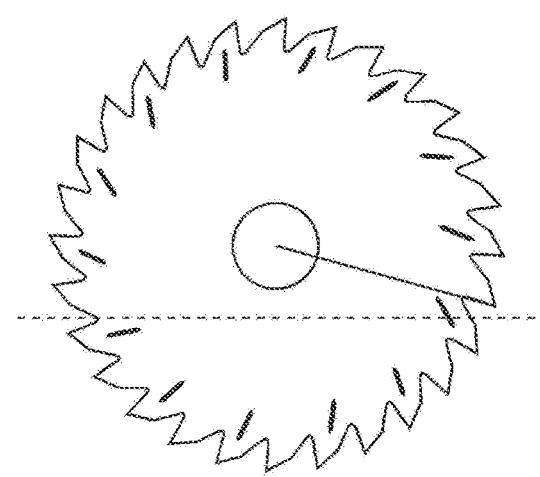
Figure 16A:
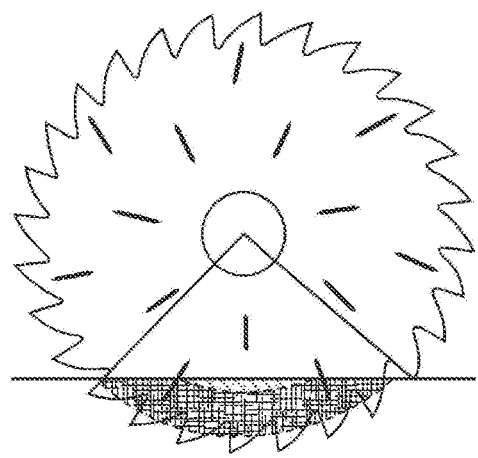
FIGS. 16A-16D are diagrams of sidewall pressure the insert effect on the soil at various blade depths in accordance with embodiments of the present invention.
Figure 16B:
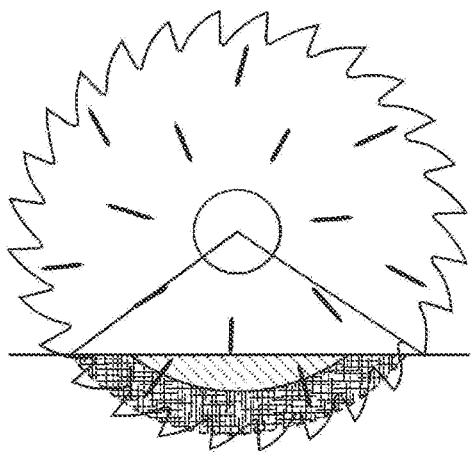
Figure 16C:
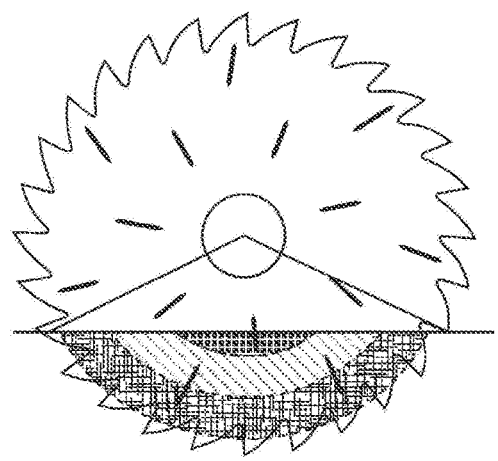
Figure 16D:
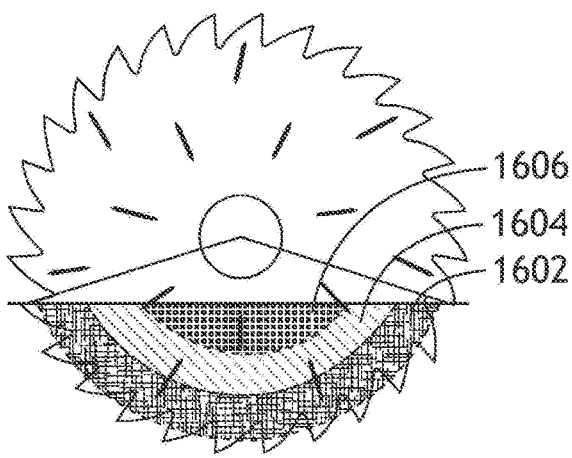

Referring to FIG. 15A-15D, diagrams of insert effect on the soil at various blade depths in accordance with embodiments of the present invention are shown. The angle of soil 170 entry of each tooth 110 and insert 120 may be altered by the soil depth at which the coulter blade 140 is operated. For example, at an exemplary depth of 3.25 inches in FIG. 15A, an insert 120 may enter the soil at an angle of approximately 45 degrees from horizontal and exit the soil after approximately 90 degrees of travel. Conversely, at a greater depth as shown in FIG. 15B, an insert 120 may impact the soil at approximately 40 degrees from horizontal and exit the soil after 110 degrees of rotation. Similarly for FIG. 15C, insert 120 enters the soil at 20 degrees and exits after 120 degrees of rotation. Similarly for FIG. 15D, insert 120 enters the soil at 0 degrees and exits after 135 degrees of rotation. This difference may allow an operator to accurately determine an amount of soil to impact, aerate, and bring to the surface.

Referring to FIG. 16A-16D, diagrams of sidewall pressure the insert effect on the soil at various blade depths in accordance with embodiments of the present invention are shown. An additional goal of the invention may include a coulter blade 140 able to cut and aerate the soil with minimal lateral pressure on the soil as the coulter blade 140 interacts with the soil. This undesirable lateral pressure or sidewall push (a lateral force on the soil as the blade interacts) may cause a smearing or trowelling action as a result of blade soil interaction creating a compacted soil barrier impenetrable by a future root system. Each tooth on the variable tooth coulter blade 140 may be sharpened only on one side, while the adjacent tooth is sharpened on the opposite side. This alternate sharpening may eliminate overall coulter blade 140 sidewall push by opposite and counteracting lateral pressure of each tooth as the tooth interacts with the soil.

An additional goal of the present invention may include a minimum amount of friction along the sidewall of the coulter blade 140. Any amount of friction along the sidewall of the coulter blade 140 causes an increase amount of force required to pull the coulter blade 140 through the soil. As an object enters the soil, the surrounding soil tends to grip or hold on to the object. Soils with a higher CEC have a greater ability to grasp the object. As the coulter blade 140 depth increased, area 1602 may be the only sidewall interacting with the soil. As depth in increased, areas 1604 and 1606 become engaged with the soil thus increasing the need for sidewall pressure reduction. Embodiments of the present invention create a contact area limited to the portion of the coulter blade 140 more distal from the hub where the sidewall of the coulter blade 140 closer to the hub remains free from soil contact.

Alternatively, a coulter blade 140 of the present invention may be shaped in a concave design to enable side movement of soil as well as cutting of stubble on the surface. For example, a plurality of concave coulter blade 140s may act to cut the stubble on the surface of the field as well as slightly move the soil laterally after soil aeration.

Further, it is contemplated embodiments of the present invention may include a coulter blade 140 for interacting with the side walls of a trench to back fill the void above the trench contents. For example, a trench dug for tile requires backfill after the tile has been laid. Embodiments of the present invention interact with the soil on the sides of the trench as a closing wheel to fill the void above the tile. This backfill creates the archway above the tile preventing the tile from being crushed from additional weight.

Figure 17B:
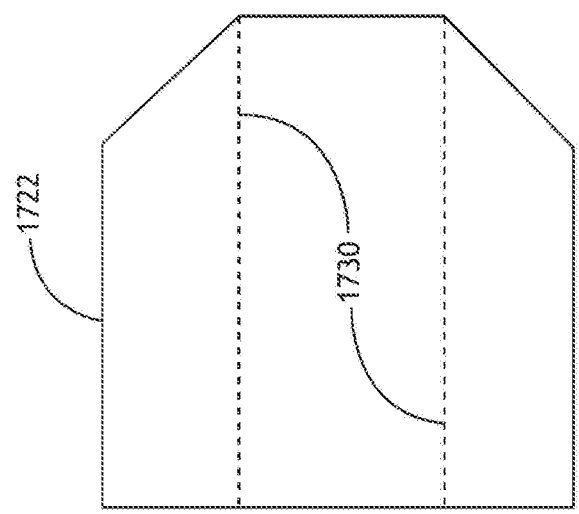
FIGS. 17A and 17B are diagrams of exemplary inserts in accordance with an embodiment of the present invention.
Figure 17A:
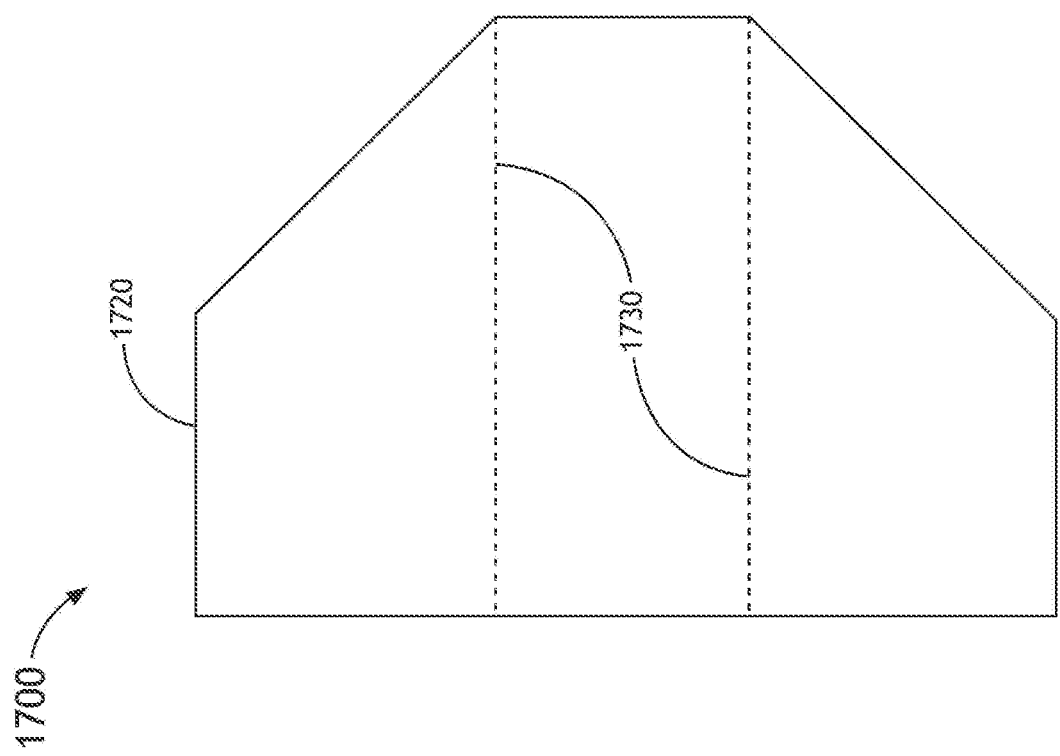

Referring to FIGS. 17A and 17B, diagrams of exemplary inserts in accordance with an embodiment of the present invention are shown. An additional goal of the present invention may include aeration of the soil with which the variable tooth coulter blade 140 makes contact. Variable size, angle, and number of inserts 1720 1722 aerate the soil with which the coulter blade 140 comes into contact. The inserts 120 dig as low as the operator desires and aerate the sub compacted soil sufficiently to aid in follow on root penetration. Securably mounted along lines 1730 of coulter blade insert opening alignment, the lateral extension of each insert 1720 1722 may impact the soil.

As each insert 1720 1722 interacts with the soil, the insert 1720 1722 will also aerate soil adjacent to the soil directly touched by the insert 1720 1722. This adjacent aeration effect allows for the operator to create the desired tillage by manipulation of the speed of the vehicle and depth of the coulter blade 140. The greater the speed of the vehicle, the greater the adjacent aeration effect. Preferably a minimum speed may be in the range of two to five miles per hour while a maximum speed may be in the range of eight to ten miles per hour. It is contemplated herein; speeds less than two or greater than ten miles per hour may also be optimal for coulter blades 140 described within the scope of the present invention.

Insert Width

The width of the insert 1720 1722 may determine an amount of soil desired to be altered. For example, a wider insert 1720 extending laterally from the blade 140 may contact a greater amount of soil causing the greater amount of soil to be fractured and aerated. Conversely, a narrower insert 1722 may preclude insert breakage should the coulter blade 140 contact a rock.

Insert Size and Shape

The shape and size of the insert 1720 1722 may determine the amount of aeration of the soil as well as resistance to breakage in certain types of soil. For example, in rocky soil, a more robust insert 1722 may resist breakage as a result of impact with a rock. For example, in heavy soil, an insert 1720 1722 of square shape may optimally interact with the heavy soil. In light soil, an insert 120 of tapered or swept shape may allow for less contact with the soil while optimally aerating the soil.

Figure 18:
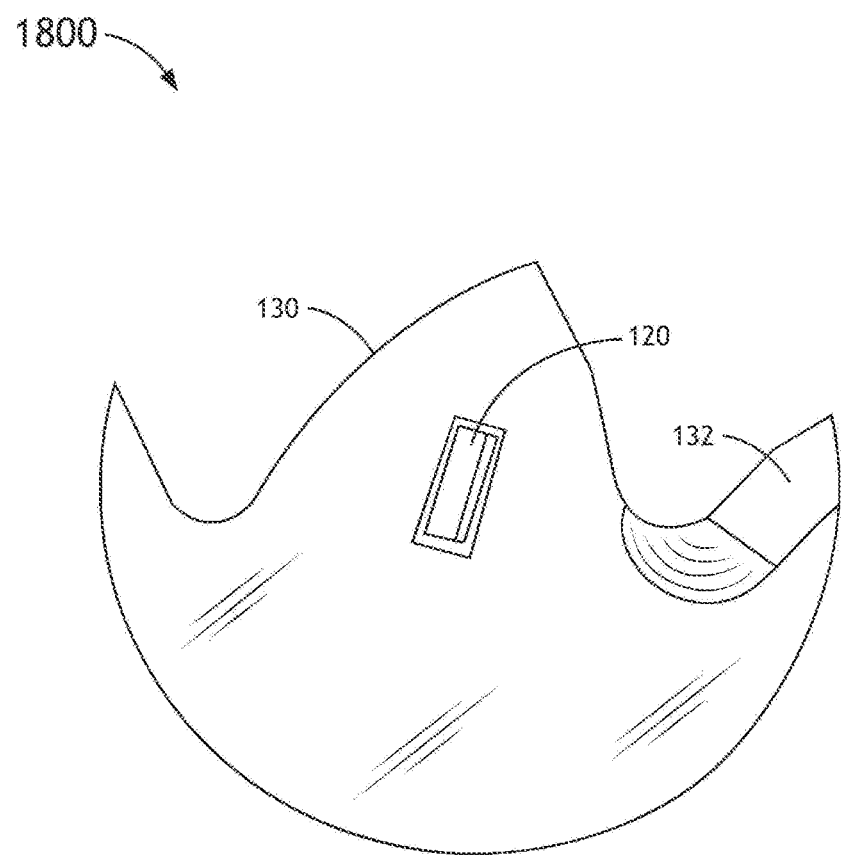
FIG. 18 is a detail diagram of exemplary insert location and size in accordance with an embodiment of the present invention.

Referring to FIG. 18, a detail diagram of exemplary insert location and size in accordance with an embodiment of the present invention is shown. The angle of the insert 120 may determine penetration as well as aeration of the soil. Insert 120 positioned near the blade circumference within tooth 130 may provide greater aeration than would an insert more proximal to the blade hub.

Figure 19B:
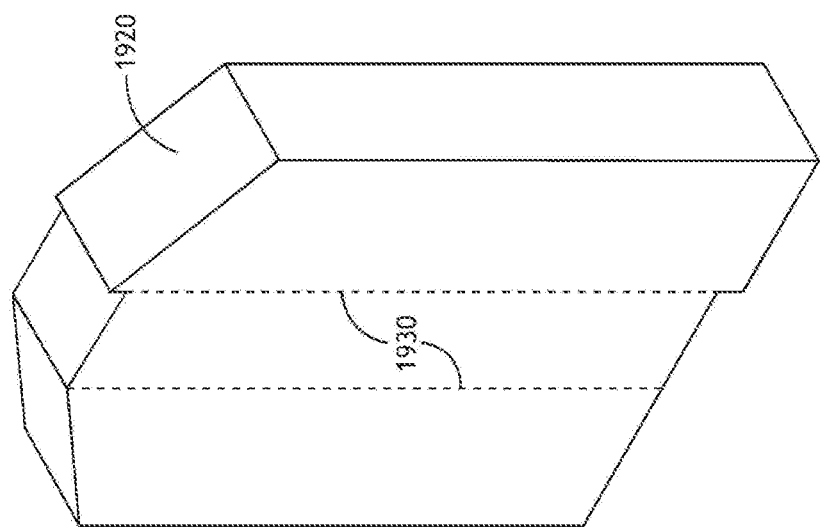
FIGS. 19A and 19B are diagrams of one insert exemplary of an embodiment of the present invention.
Figure 19A:
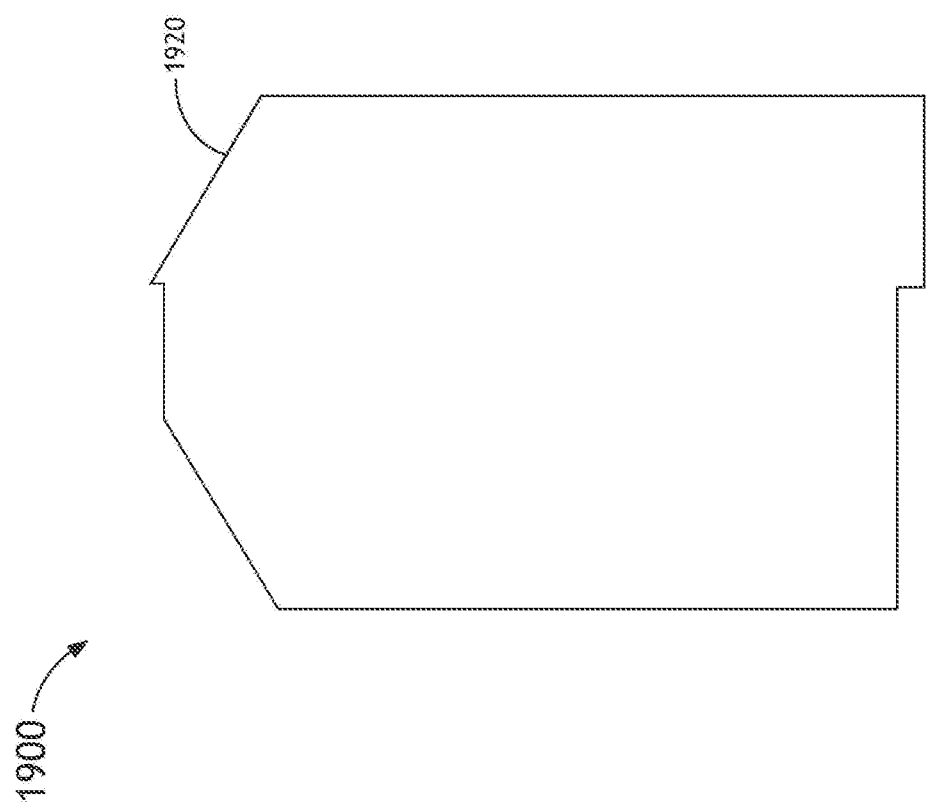

Referring to FIGS. 19A and 19B, diagrams of one insert exemplary of an embodiment of the present invention are shown. One embodiment of insert 1920 may include an insert mountable within coulter blade insert opening from one lateral side. Mounted along alignment lines 1930, insert 1920 may be more easily mounted with a weld required on one side. It is contemplated herein; equal surface areas on insert 1920 lateral extensions may enable equal forces on the insert 1920. For example, flanged side of insert 1920 may extend laterally a lesser amount than non-flanged side of insert 1920 to enable equal pressure on both lateral extensions.

Figure 20B:
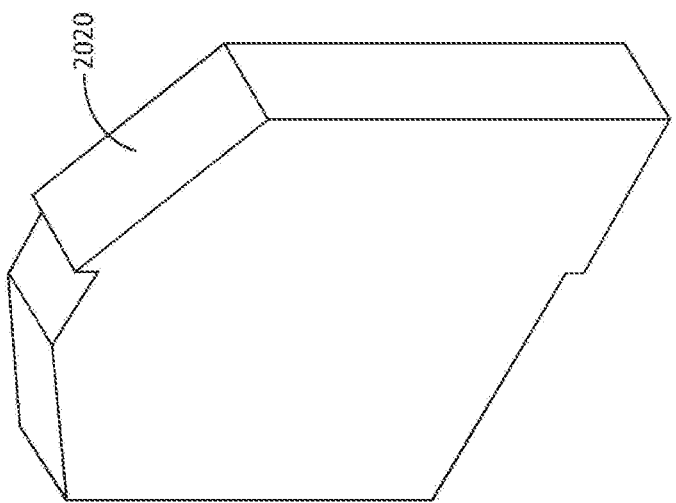
FIGS. 20A and 20B are diagrams of one insert exemplary of an embodiment of the present invention.
Figure 20A:
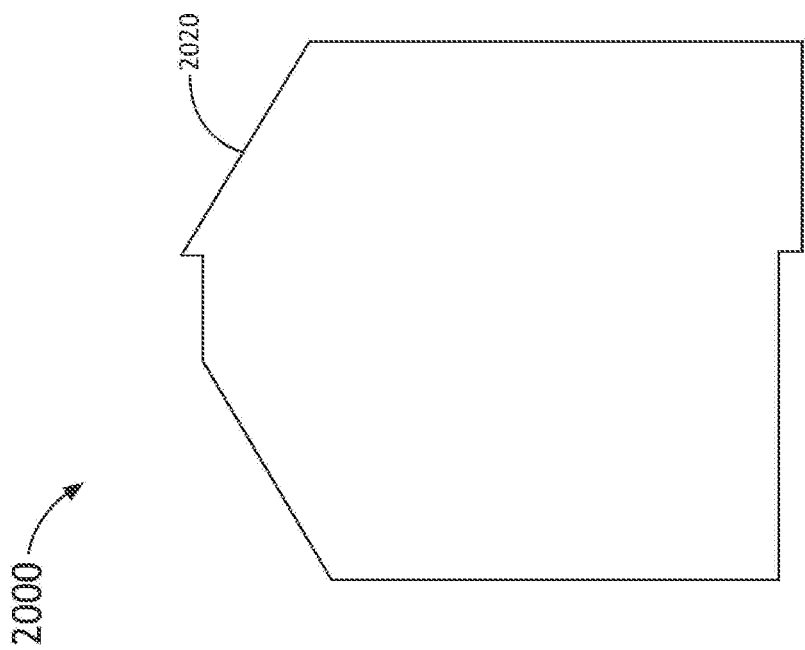
Figure 22:
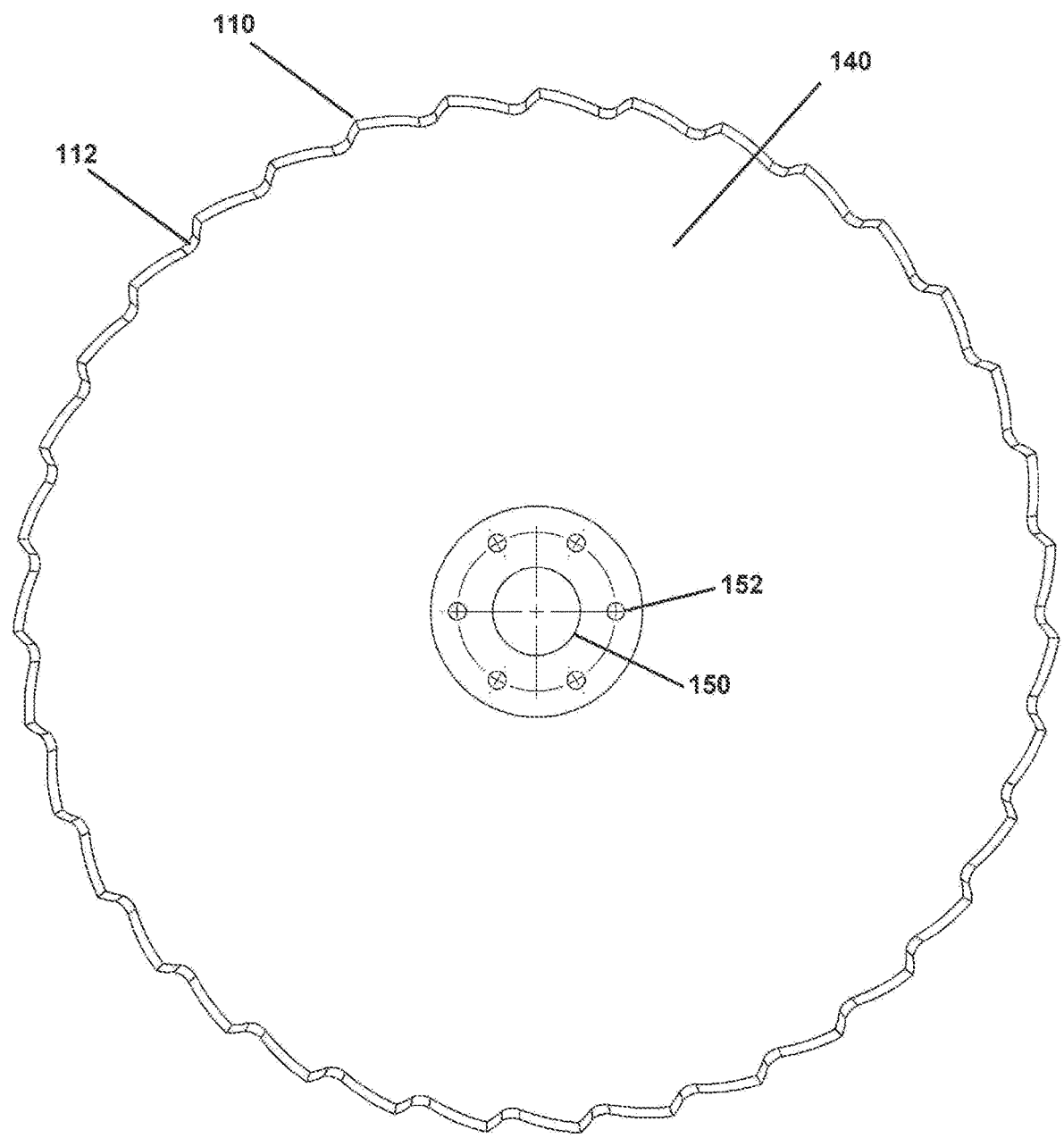
FIG. 22 is a detail diagram of exemplary insert location and size in accordance with an embodiment of the present invention.
Figure 23:
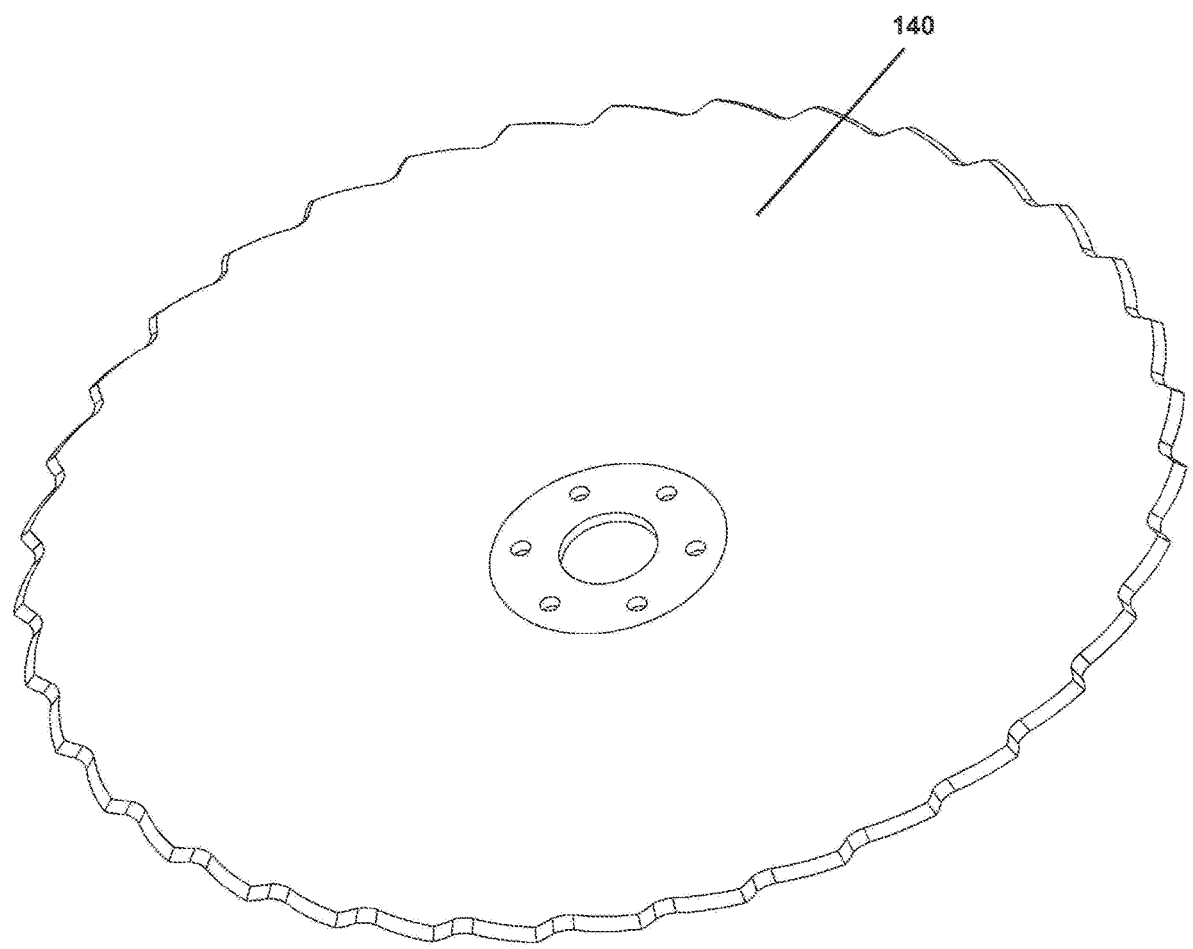
FIG. 23 is a detail diagram of exemplary insert location and size in accordance with an embodiment of the present invention.
Figure 24:
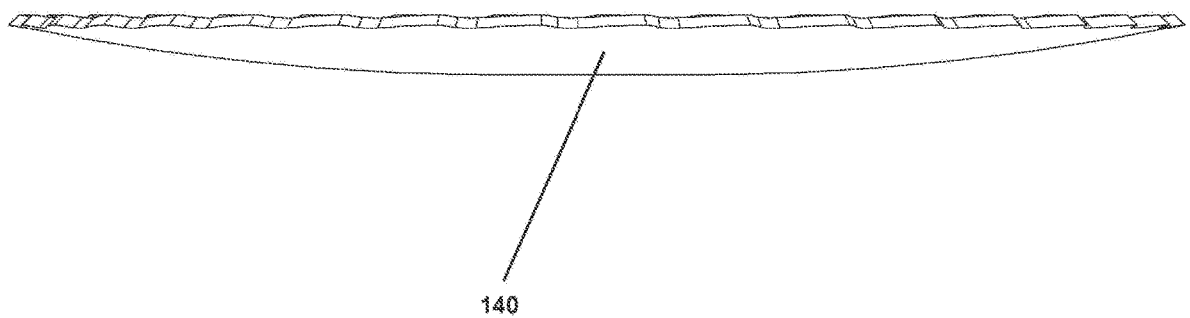
FIG. 24 is a detail diagram of exemplary insert location and size in accordance with an embodiment of the present invention.
Figure 25:
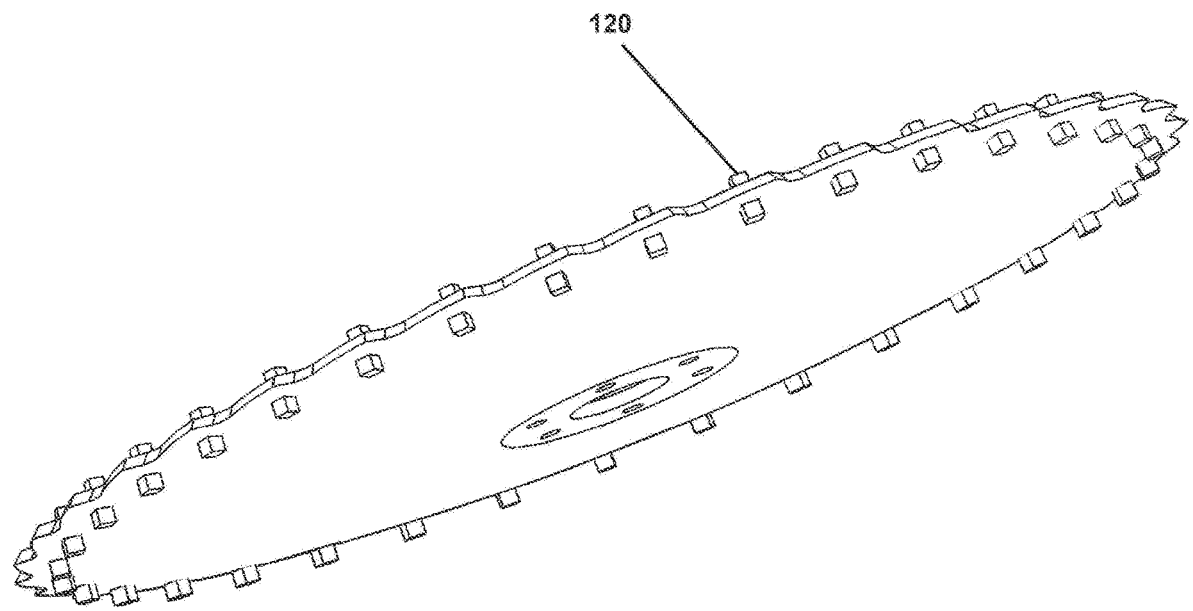
FIG. 25 is a detail diagram of exemplary insert location and size in accordance with an embodiment of the present invention.
Figure 26:
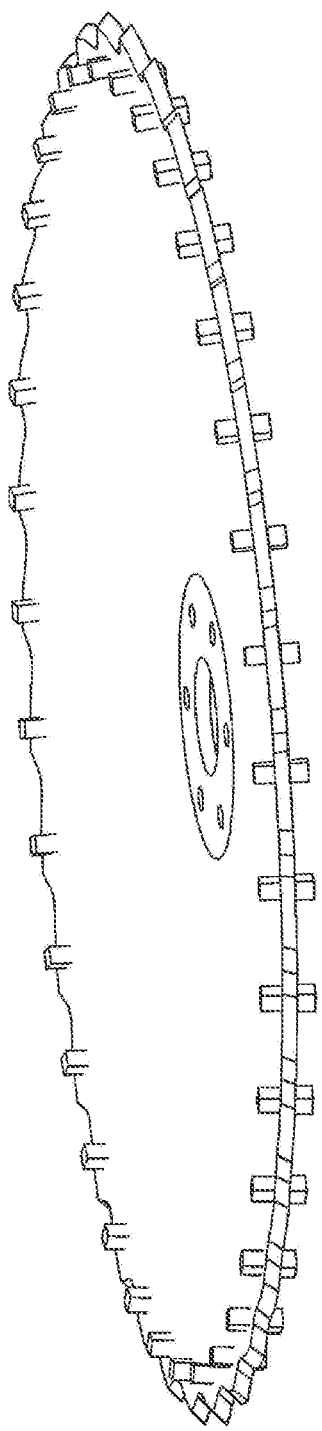
FIG. 26 is a detail diagram of exemplary insert location and size in accordance with an embodiment of the present invention.
Figure 27:
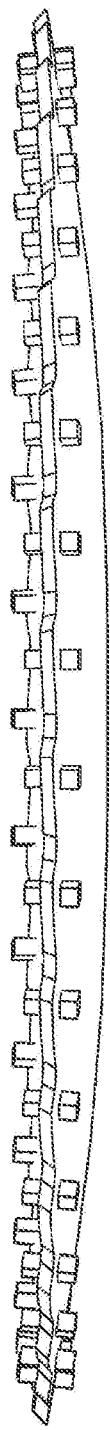
FIG. 27 is a detail diagram of exemplary insert location and size in accordance with an embodiment of the present invention.

Referring to FIGS. 20A and 20B, diagrams of one insert exemplary of an embodiment of the present invention are shown. An additional embodiment of insert 2020 may enable a greater amount of insert soil interaction.

Referring to FIG. 21, flowchart for a method for altering surface stubble and soil aeration exemplary of an embodiment of the present invention is shown. Method 2100 may begin at step 2102 with embedding a discoidal coulter blade within the soil, the discoidal coulter blade configured with a blade hub and a blade circumference, the discoidal coulter blade having a plane parallel to each diameter line of the discoidal coulter blade, the blade hub configured for detachably mounting the discoidal coulter blade to an implement. Method 2100 continues with step 2104 with translating the discoidal coulter blade through the soil at a depth via the implement and, at step 2106 with cutting the surface stubble and soil via a plurality of teeth configured proximal to and integral with the blade circumference, each one of the plurality of teeth having a cutting edge and a back edge, the back edge longitudinally opposite the cutting edge, the cutting edge and the back edge linear with the plane, the cutting edge configured to cut the surface stubble and the soil, the back edge configured for driving the discoidal coulter blade rotationally parallel to the plane as the soil acts on the back edge. Method 2100 may conclude with step 2108 with aerating the soil via a plurality of inserts sized to securably mount within a plurality of evenly spaced insert openings, the insert openings configured in a circular pattern at a first radius from the blade hub, the first radius being less than the blade circumference, each of the plurality of evenly spaced insert openings having an insert angle, the plurality of evenly spaced insert openings at the insert angle, each one of the plurality of inserts configured to securably mount within one of the plurality of evenly spaced insert openings, each one of the plurality of inserts sized to fill an associated one of the plurality of evenly spaced insert openings, each one of the plurality of inserts is configured to extend, from the discoidal coulter blade, a lateral distance normal to the plane, the plurality of inserts configured to alter the soil as a portion of the insert, which extends the lateral distance, rotationally and translationally interacts with the soil.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. A coulter blade for altering soil and surface stubble, comprising:
   a discoidal coulter blade having a blade circumference and configured for detachably mounting the discoidal coulter blade to an implement;
   a plurality of teeth configured proximal to and integral with the blade circumference, each one of the plurality of teeth having a gullet adjacent thereto, each one of the plurality of teeth having a cutting edge and a back edge, the back edge longitudinally opposite the cutting edge, the cutting edge configured to cut the surface stubble and the soil, the back edge configured for driving the discoidal coulter blade as the soil acts on the back edge, the gullet being shaped to continue the cut begun by the cutting edge;
   the cutting edge of the plurality of teeth being shaped in a sabre or curved shape extending into the gullet and continuing into the back edge;
   whereby said discoidal coulter blade rotationally interacts with the soil to translate in a forward direction.

2. The coulter blade for altering soil and surface stubble of claim 1, wherein the discoidal coulter blade comprises a hub for detachably mounting the discoidal coulter blade to the implement.

3. The coulter blade for altering soil and surface stubble of claim 1, the gullet having a rounded shape.

4. The coulter blade for altering soil and surface stubble of claim 1, the gullet having a wedge shape.

5. The coulter blade for altering soil and surface stubble of claim 1, the coulter blade being operative on at least one of a planter implement to open a planting trench, planter device, seeding device and fertilizer device.

6. The coulter blade for altering soil and surface stubble of claim 1, wherein the cutting edge is curved.

7. The coulter blade for altering soil and surface stubble of claim 1, wherein the discoidal coulter blade has a planar shape with a blade first lateral side and a blade second lateral side, and having a width, wherein the first lateral side and the second lateral side oppose one another.

8. The coulter blade for altering soil and surface stubble of claim 1, wherein the plurality of teeth having a planar shape with a first lateral side and a second lateral side, wherein the first lateral side and the second lateral side oppose one another.

9. The coulter blade for altering soil and surface stubble of claim 1, wherein the back edge of the tooth is specifically shaped to pull the coulter blade into the soil and maintain the rotation of the coulter blade, a shape of the back edge of the tooth is one of a flat tooth back and a flared tooth back.

10. The coulter blade for altering surface stubble and soil aeration of claim 1, wherein the blade circumference is based at least on one of: a desired rotation speed, a soil type, a desired tooth depth, a desired insert depth.

11. The coulter blade for altering surface stubble and soil aeration of claim 1, wherein the cutting edge of a first half of the plurality of teeth is sharpened on a first lateral side and the cutting edge of a second half of the plurality of teeth is sharpened on a second lateral side, each tooth of the first half having two teeth of the second half planarly adjacent and each tooth of the second half having two teeth of the first half planarly adjacent.

12. The coulter blade for altering soil and surface stubble of claim 1, wherein the back edge is flat.

13. The coulter blade for altering soil and surface stubble of claim 1, wherein the back edge is flared.

14. The coulter blade for altering soil and surface stubble of claim 1, wherein the back edge is curved.

15. The coulter blade for altering soil and surface stubble of claim 1, wherein the back edge is sharpened.

16. The coulter blade for altering surface stubble and soil aeration of claim 15, wherein the back edge continues the cut begun by the gullet and the cutting edge.

17. A method for altering surface stubble and soil aeration, comprising:
   embedding a discoidal coulter blade within the soil, the discoidal coulter blade having a blade circumference and configured for detachably mounting the discoidal coulter blade to an implement;

translating the discoidal coulter blade through the soil at a depth via the implement;

translating the soil as the discoidal coulter blade translates through the soil;

driving the discoidal coulter blade rotationally parallel to the blade circumference as the soil acts on a back edge of a plurality of teeth configured proximal to and integral with the blade circumference, each one of the plurality of teeth having a gullet adjacent thereto, each one of the plurality of teeth and gullet having a cutting edge and a back edge, the back edge longitudinally opposite the cutting edge, the cutting edge of the plurality of teeth being shaped in a sabre or curved shape extending into the gullet and continuing and oppositely terminating into the back edge, the cutting edge configured to cut the surface stubble and the soil, the back edge configured for driving the discoidal coulter blade rotationally parallel to the blade circumference as the soil acts on the back edge, the gullet being shaped to continue the cut begun by the cutting edge;

cutting the surface stubble and the soil as the soil acts on the cutting edge of the plurality of teeth, the cutting edge of a first half of the plurality of teeth is sharpened on a first lateral side and the cutting edge of a second half of the plurality of teeth is sharpened on a second lateral side, each tooth of the first half having two teeth of the second half planarly adjacent and each tooth of the second half having two teeth of the first half planarly adjacent;

wherein the discoidal coulter blade rotationally and translationally interacts with the soil.

18. The method for altering surface stubble and soil aeration of claim 17 comprising cutting the soil with a Downward Pressure (DP), wherein DP is be directly proportional to a force required to pull the tillage equipment (FP) through the soil, wherein a reduction in DP equals a corresponding reduction in FP.

19. The method for altering soil and surface stubble of claim 17, wherein the cutting edge is curved.

20. The method for altering soil and surface stubble of claim 17, wherein the back edge of the tooth is specifically shaped to pull the coulter blade into the soil and maintain the rotation of the coulter blade, a shape of the back edge of the tooth is one of a flat tooth back and a flared tooth back.

21. A method for altering surface stubble and soil aeration, comprising:

embedding a discoidal coulter blade within the soil, the discoidal coulter blade having a blade circumference and configured for detachably mounting the discoidal coulter blade to an implement;

translating the discoidal coulter blade through the soil at a depth via the implement;

translating the soil as the discoidal coulter blade translates through the soil;

cutting the soil with a Downward Pressure (DP), wherein DP is directly proportional to a force required to pull the tillage equipment (FP) through the soil, wherein a reduction in DP equals a corresponding reduction in FP;

driving the discoidal coulter blade rotationally parallel to the plane as the soil acts on a back edge of a plurality of teeth configured proximal to and integral with the blade circumference, each one of the plurality of teeth having a gullet adjacent thereto, each one of the plurality of teeth and gullet having a cutting edge and a back edge, the back edge longitudinally opposite the cutting edge, the cutting edge of the plurality of teeth being shaped in a sabre or curved shape extending into the gullet and continuing into the back edge, the cutting edge configured to cut the surface stubble and the soil, the back edge configured for driving the discoidal coulter blade rotationally parallel to the blade circumference as the soil acts on the back edge, the gullet being shaped to continue the cut begun by the cutting edge;

cutting the surface stubble and the soil as the soil acts on the cutting edge of the plurality of teeth;

wherein the discoidal coulter blade rotationally and translationally interacts with the soil.

* * * * *